US009350148B2

(12) United States Patent
Emanuel

(10) Patent No.: US 9,350,148 B2
(45) Date of Patent: May 24, 2016

(54) UTILITY METER BOX AND METER BOX COVER

(71) Applicant: Trumbull Manufacturing, Inc., Youngstown, OH (US)

(72) Inventor: Blake Emanuel, Girard, OH (US)

(73) Assignee: Trumbull Manufacturing, Inc., Youngstown, OH (US)

( * ) Notice: Subject to any disclaimer, the term of this patent is extended or adjusted under 35 U.S.C. 154(b) by 93 days.

(21) Appl. No.: 14/215,567

(22) Filed: Mar. 17, 2014

(65) Prior Publication Data
US 2014/0268506 A1   Sep. 18, 2014

Related U.S. Application Data

(60) Provisional application No. 61/825,554, filed on May 21, 2013, provisional application No. 61/792,684, filed on Mar. 15, 2013.

(51) Int. Cl.
*H02G 3/08* (2006.01)
*G01F 15/14* (2006.01)
*H02G 9/10* (2006.01)
*H02G 3/14* (2006.01)

(52) U.S. Cl.
CPC .............. *H02G 3/081* (2013.01); *G01F 15/14* (2013.01); *H02G 9/10* (2013.01); *H02G 3/14* (2013.01)

(58) Field of Classification Search
CPC .................................. H02G 2/081; G01F 15/14
USPC .................... 137/364–372; 361/659
See application file for complete search history.

(56) References Cited

U.S. PATENT DOCUMENTS

| | | | | | |
|---|---|---|---|---|---|
| 582,354 | A | * | 5/1897 | Hoppes | E03B 7/072 137/364 |
| 794,661 | A | * | 7/1905 | Clark | E03B 9/10 137/371 |
| 911,256 | A | * | 2/1909 | McWane | F16J 13/04 126/319 |
| 1,156,530 | A | * | 10/1915 | Howell | E03B 9/10 137/371 |
| 1,232,789 | A | * | 7/1917 | Gibson | 137/362 |
| 1,454,674 | A | * | 5/1923 | Flournoy | E03B 9/10 137/371 |
| 1,548,767 | A | * | 8/1925 | Steele | E05B 65/0057 137/371 |
| 1,600,761 | A | * | 9/1926 | Haase | E03B 9/10 137/364 |
| 1,684,983 | A | * | 9/1928 | Clark | G01F 15/14 220/484 |
| 1,774,307 | A | * | 8/1930 | Willig | G01F 15/14 137/371 |
| 1,923,481 | A | * | 8/1933 | Ford | G01F 15/14 210/163 |

(Continued)

OTHER PUBLICATIONS

Nicor, Inc., Read-Rite Polymer Lids Specifications, Aug. 2007.*

(Continued)

*Primary Examiner* — Craig Schneider
*Assistant Examiner* — Daniel P Donegan
(74) *Attorney, Agent, or Firm* — Roger D. Emerson; Emerson Thomson Bennett, LLC

(57) ABSTRACT

Provided is a meter box, a meter box cover and methods and apparatuses related to meter boxes and meter box covers. The meter box and meter box cover may include features which allow the meter box and meter box cover to be secured to each other and may be manufactured from materials which allow automated reading of a meter positioned within an enclosed meter box using wireless signal transmission methods.

20 Claims, 26 Drawing Sheets

(56) References Cited

U.S. PATENT DOCUMENTS

| | | | | |
|---|---|---|---|---|
| 4,048,766 | A * | 9/1977 | Dantzer | E02D 29/14 137/364 |
| 4,305,282 | A * | 12/1981 | Hunt | G01F 15/18 73/201 |
| 6,886,577 | B1 * | 5/2005 | Phillips | E02D 29/14 137/15.01 |
| 7,619,878 | B1 * | 11/2009 | Cook | G01D 4/02 137/364 |
| 8,827,589 | B2 * | 9/2014 | Jurich | E02D 29/14 220/484 |
| 9,032,989 | B2 * | 5/2015 | Floyd | E02D 29/12 137/363 |
| 2003/0037818 | A1 * | 2/2003 | Helle | E03B 7/072 137/364 |
| 2010/0077677 | A1 * | 4/2010 | Floyd | E02D 29/12 52/169.14 |
| 2011/0180159 | A1 * | 7/2011 | Ericksen | F16K 27/12 137/364 |
| 2014/0268506 | A1 * | 9/2014 | Emanuel | H02G 3/081 361/659 |

OTHER PUBLICATIONS

Nicor, Inc. Read-Rite Lids, Archived Aug. 12, 2006.*
A.Y. McDonald Mfg. Co., "Coiled Pit Installation" Brochure, May 2012.
A.Y. McDonald Mfg. Co., "Series 790, Coiled Pit Assembly" Brochure, May 2012.
The Ford Meter Box Company, Inc., "Ford Brings the Best Coil Pit Setter to the Surface" Brochure, Dec. 2008.
Mueller Co., "Mueller All Along the Line!" Brochure, pdf file created Nov. 13, 2009, publication date unknown.

* cited by examiner

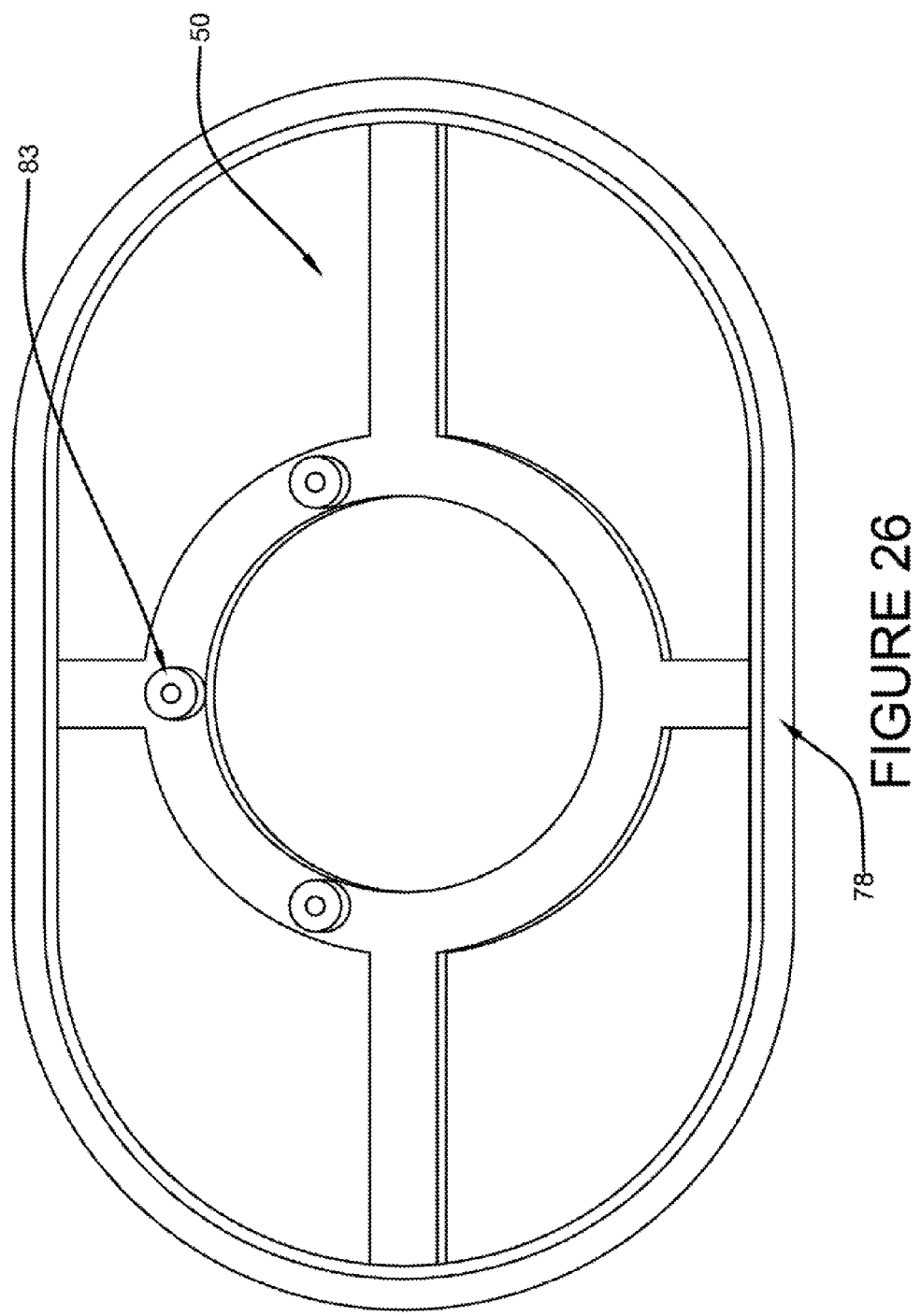

UTILITY METER BOX AND METER BOX COVER

CROSS REFERENCE TO RELATED APPLICATIONS

This application claims the benefit under 35 U.S.C. §119 (e) of U.S. Provisional Application No. 61/825,554, filed May 21, 2013 which claims the benefit of U.S. Provisional Application No. 61/792,684, filed Mar. 15, 2013.

TECHNICAL FIELD

The following disclosure generally relates to methods and apparatuses relating to meter boxes and meter box covers. More specifically, the disclosure relates to an improved method of securing meter covers to a meter box and to meter covers made from materials which allow automated reading of the meter using wireless signal transmission methods.

BACKGROUND

It is well known in the art to provide a meter box cover for a utility meter mounted in a recessed container. Water meters are often mounted inside meter boxes which are then buried below ground level. The meter cover provides protection from debris, the weather elements, and unintended access to the meter. It is also known to secure these meter covers by a locking mechanism thus preventing tampering, vandalism, or accidental dislodging of the cover. It also has become more common for meter readers to read utility meters remotely using electronic equipment that can access various wireless data transmission channels.

Known meter covers are made from cast iron, steel, brass, and bronze. Although these materials are very durable, they are less conductive to wireless signal transmissions. Also these materials tend to be heavy thus making installation and removal of the covers difficult. Moreover, these materials may corrode over time making the cover locking mechanism difficult to use.

Attempted solutions to the corrosion problem include making the meter covers from concrete-polymer blends. These poly-concrete formulations may avoid corrosion but they also can be prone to cracking.

One attempted solution to the signal transmission problem was to make the meter covers from plastic formulations. A plastic meter cover may provide better wireless signal transmission properties but meter covers made from some types of plastic can degrade under UV light exposure, crack under pressure, or simply float away in flood conditions. Plastic covers may weigh significantly less than metallic or concrete covers. This reduction in weight can result in the meter cover becoming dislodged or unseated from the meter box in certain situations such as when run over by a vehicle.

What is needed is a light weight, durable meter cover that can provide improved wireless signal transmission characteristics and also a securement means and method which will enable the cover to be secured to the meter box so that it will not become dislodged or unseated under certain conditions.

SUMMARY

A meter box cover is provided having a top surface, a bottom surface, a sealing surface and a securing mechanism, wherein the sealing surface of the meter box cover is capable of engaging a receiving surface on an open end of a meter box, wherein the meter box cover is manufactured from materials capable of allowing automated reading of a meter positioned within an enclosed meter box using wireless signal transmission methods and wherein the securing mechanism of the meter box cover is capable of engaging a portion of the meter box to secure the meter box cover to the meter box.

Also provided is a meter box comprising an open end, a bottom end, at least one vertical wall, an exterior, and an interior; at least a first and a second utility line connector positioned on the exterior proximate to the bottom end of the meter box which extend through the wall of the meter box; a meter platform which is designed to engage an inlet valve, an outlet valve, and a utility meter within the interior of the meter box; at least one upper support shelf and at least one lower support shelf within the interior of the meter box capable of engaging and supporting the meter platform in a substantially horizontal position; conduit which runs from the first utility line connector, through the interior of the meter box to the inlet valve; conduit which runs from the inlet valve to the utility meter; conduit which runs from the utility meter to the outlet valve; conduit which runs from the outlet valve through the interior of the meter box to the second utility line connector; and a meter box cover having a top surface, a bottom surface and a sealing surface, wherein the meter box cover is capable of being placed over the open end of the meter box to cover the interior of the meter box, wherein the sealing surface of the meter cover engages a receiving surface on the open end of the meter box and wherein the meter box cover is fabricated from a composite polymer capable of providing radio frequency transparency and comprises a securing mechanism capable of engaging a portion of the meter box to secure the meter box cover to the meter box.

Also provided is a meter box cover for a meter box wherein the meter box comprises an open end, a bottom end, at least one vertical wall, an exterior, and an interior; at least a first and a second utility line connector positioned on the exterior proximate to the bottom end of the meter box which extends through the wall of the meter box; a meter platform which is designed to engage an inlet valve, an outlet valve, and a utility meter within the interior of the meter box; at least one upper support shelf and at least one lower support shelf within the interior of the meter box capable of engaging and supporting the meter platform in a substantially horizontal position; conduit which runs from the first utility line connector, through the interior of the meter box to the inlet valve; conduit which runs from the inlet valve to the utility meter; conduit which runs from the utility meter to the outlet valve; conduit which runs from the outlet valve through the interior of the meter box to the second utility line connector; and wherein the meter box cover comprises a top surface, a bottom surface and a sealing surface, wherein the meter box cover is capable of being placed over the open end of the meter box to cover the interior of the meter box, wherein the sealing surface of the meter cover engages a receiving surface on the open end of the meter box; wherein the meter box cover comprises a securing mechanism capable of engaging a portion of the meter box to secure the meter box cover to the meter box; wherein the securing mechanism comprises a retaining hook and a worm gear latch located on the bottom surface proximate to the perimeter of the meter box cover and positioned substantially 180 degrees from each other, wherein the retaining hook comprises a securing portion capable of engaging a securing feature on a first upper support shelf and a clearance portion and alignment cutouts allowing the bottom surface of the meter box cover to engage the first upper support shelf and wherein the worm gear latch is capable of engaging a securing feature on a second upper support shelf.

BRIEF DESCRIPTION OF THE DRAWINGS

The devices described below may take any physical form in certain parts and arrangements of parts, exemplary embodiments of which are described in detail in this specification and illustrated in the accompanying drawings which form a part hereof and wherein:

FIG. 26 is a bottom view of an exemplary drop-in style oval meter box cover without a locking mechanism.

DETAILED DESCRIPTION

Figure 1:
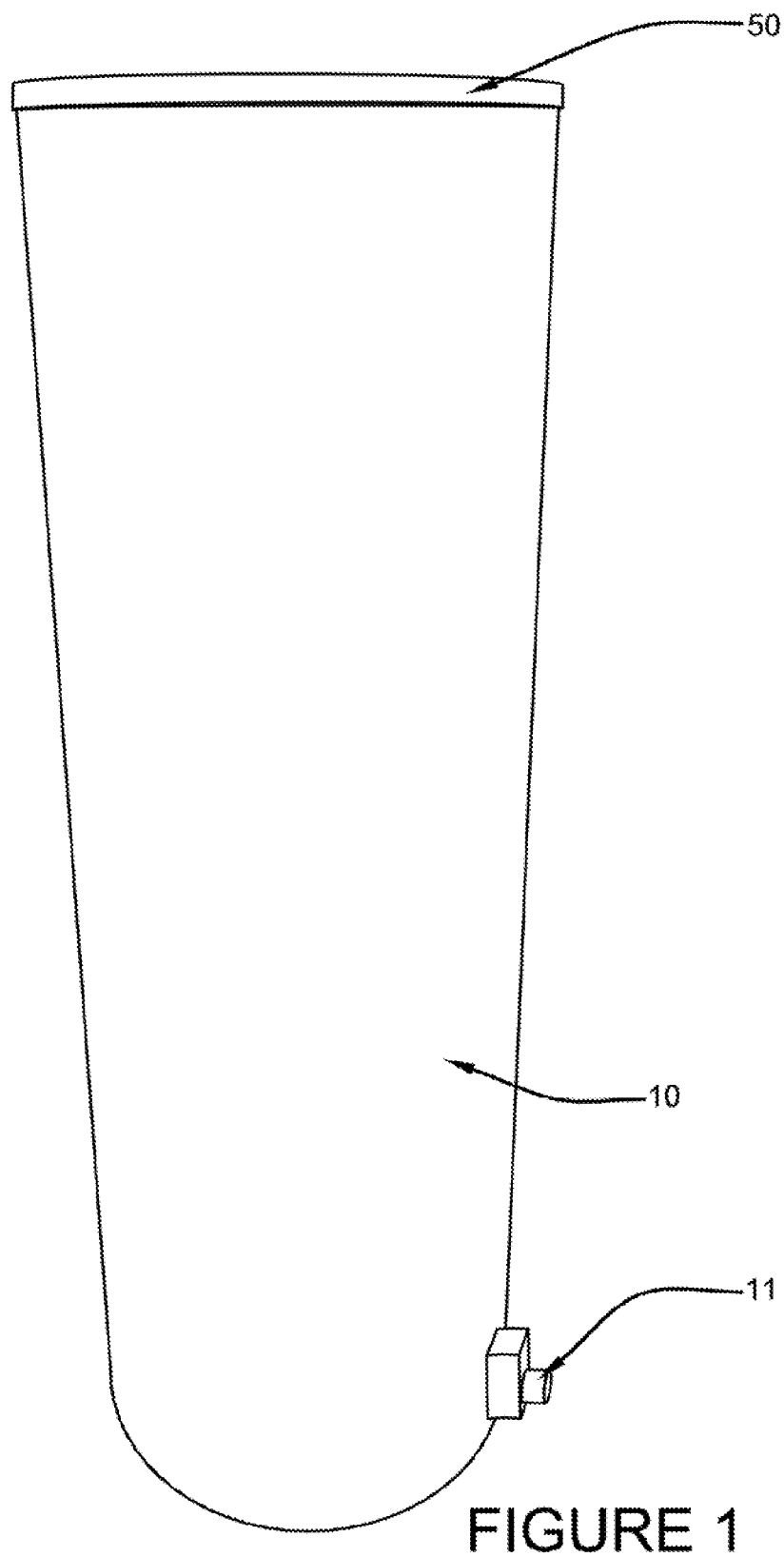
FIG. 1 is a perspective view of an exemplary meter box and meter box cover.

Provided is a meter box cover for a meter box. The meter box cover is lightweight, durable, has a high load capacity, is capable of being effectively secured to a meter box and allows for passage of radio transmission signals.

An associated meter box is also provided having an open end, a bottom end, at least one vertical wall which forms the periphery of the box, an exterior and an interior. The meter box may consist of one continuous vertical wall which forms the periphery of the box or several walls joined together to form the periphery of the box. In certain embodiments, the utility meter box may be in the shape of a cylinder.

The meter box may have at least two utility line connectors positioned on the exterior of the box which extend through the wall of the meter box to the interior of the meter box. The utility line connectors may be located at any point along the exterior surface of the box. In certain embodiments, the utility line connectors are positioned proximate to the bottom end of the meter box. In certain embodiments, the meter box comprises a first utility line connector which functions as an inlet and a second utility line connector which functions as an outlet. Multiple inlet and outlet utility line connectors may also be incorporated into the meter box.

The meter box may have a meter platform which is capable of being positioned at any point along the interior of the meter box. In certain embodiments, the meter platform is also moveable at any point within the interior of the meter box. The meter platform, in certain embodiments is designed to engage or hold any one of or a combination of an inlet valve, an outlet, and/or a utility meter. The meter platform may, in certain embodiments, comprise at least two retaining apertures for engaging and holding at least one inlet valve and at least one outlet valve. In further embodiments, the meter platform may have at least one gripping aperture for moving the meter platform to its desired position within the meter box. In certain embodiments, the meter platform comprises four gripping apertures. The meter platform may be accessible from the open end of the meter box and in certain embodiments, may be positioned within the interior of the meter box so that at least portions of the inlet valve, outlet valve and/or utility meter may rest and/or be accessible from the exterior through the open end of the meter box.

The meter box may have any number of support shelves within the interior of the box capable of engaging and/or supporting either the meter platform or a meter box cover. The support shelves are capable of holding the meter platform and/or meter box cover in a substantially horizontal position, although other positions are also contemplated. The upper and lower support shelves may generally comprise a support surface and a securing feature formed on the surface opposite the support surface. The support surface and the securing feature may be used to engage and/or secure a meter box cover and/or the meter platform. In certain embodiments, the meter box has at least one upper support shelf and at least one lower support shelf. In further embodiments, the meter box has two upper support shelves and two lower support shelves. In certain embodiments, the meter box comprises a first upper support shelf and a second upper support shelf proximate to the open end of the meter box. These two upper support shelves may be positioned substantially 180 degrees from each other and at substantially the same height from the bottom end of the meter box within the interior of the meter box. In further embodiments, the meter box comprises a first and second lower support shelves positioned below the upper support shelves within the interior of the meter box which are capable of engaging the meter platform in a substantially horizontal position. The two lower support shelves may be positioned substantially 180 degrees from each other and at substantially the same height from the bottom end of the meter box within the interior of the meter box. The upper and lower support shelves may be fixedly attached to the interior wall of the meter box or alternatively, they may be integral with the interior wall of the meter box. In certain embodiments, the upper and/or lower support shelves may comprise brackets which are fixedly attached to the interior wall of the meter box.

The meter box may include conduit which runs from the utility line connectors through the interior of the meter box to utility valves and a utility meter. In certain embodiments, the meter box includes conduit which runs from a first utility line connector, through the interior of the meter box to an inlet valve, conduit which runs from the inlet valve to the utility meter, conduit which runs from the utility meter to the outlet valve, and conduit which runs from the outlet valve through the interior of the meter box to a second utility line connector. In certain embodiments, the conduit may comprise flexible tubing (e.g., pre-coiled flexible tubing). Such flexible tubing may allow for movement or adjustment of the meter platform which houses the utility meter, inlet valve and outlet valve at various points within the interior of the meter box.

The meter box cover of the meter box cover can be placed over the open end of the meter box to cover the interior of the meter box and the contents within the interior of the meter box. The meter box cover may have a top surface, a bottom surface and a sealing surface. The bottom surface of the meter box cover may have radial and/or annular ribs. The sealing surface of the meter box cover may have features that engage a receiving surface on the open end of the meter box. In certain embodiments, the meter box cover comprises at least one means of securing or engaging a portion of the meter box to the secure the meter box cover to the meter box. The securing mechanism may include any one of or any combination of a spring latch apparatus, a retaining hook and/or a worm gear latch. For example, the securing mechanism may comprise a spring latch apparatus; a spring latch apparatus and a retaining hook; a spring latch apparatus and a worm gear latch; a retaining hook; a retaining hook and a worm gear latch; or a worm gear latch. The meter box cover may be fabricated from a composite polymer material which allows for wireless signal transmission between a utility meter positioned within a closed meter box underground and a portable reader used above-ground. The ability of the composite polymer meter box cover to allow radio waves to pass through is known as radio frequency transparency. Thus, the utility meter may be read by wireless signal transmissions received by the portable reader without having to open the meter cover. The meter box cover may also include a counterbore within its center portion. In certain embodiments, this counterbore may be used for recessed installation of an antenna which allows for Automatic Meter Reading (i.e., AMR signal propagation through wireless signal transmission) between the utility meter and a portable reader. Alternatively, the bottom surface of the meter box cover may comprise at least one post to permit attachment of an Encoder Receiver Transmitter (ERT) mounting bracket. ERT is a packet radio protocol for automatic meter reading. In further embodiments, the bottom surface of the meter box cover has three posts to permit attachment of an ERT mounting bracket. In certain embodiments, the posts may be molded into the lid with threaded inserts that may be fabricated from any metal known to those of skill in the art (e.g., a brass insert) into which a screw (e.g., a stainless screw) may be threaded. The mounting bracket may be manufactured from any polymer material and may be sized to fit a radio transmitter.

The meter box cover may be lightweight, having a weight of less than about 60 lbs in certain embodiments, a weight of less than 50 lbs in other embodiments, and a weight of less than 45 lbs in further embodiments. In certain embodiments, the polymer composite meter covers may have a load rating of at least 20,000 lbs, in certain embodiments, may have a load rating of 25,000 lbs and in further embodiments may have a load rating of at least 40,000 lbs capable of supporting traffic loads.

Figure 2:
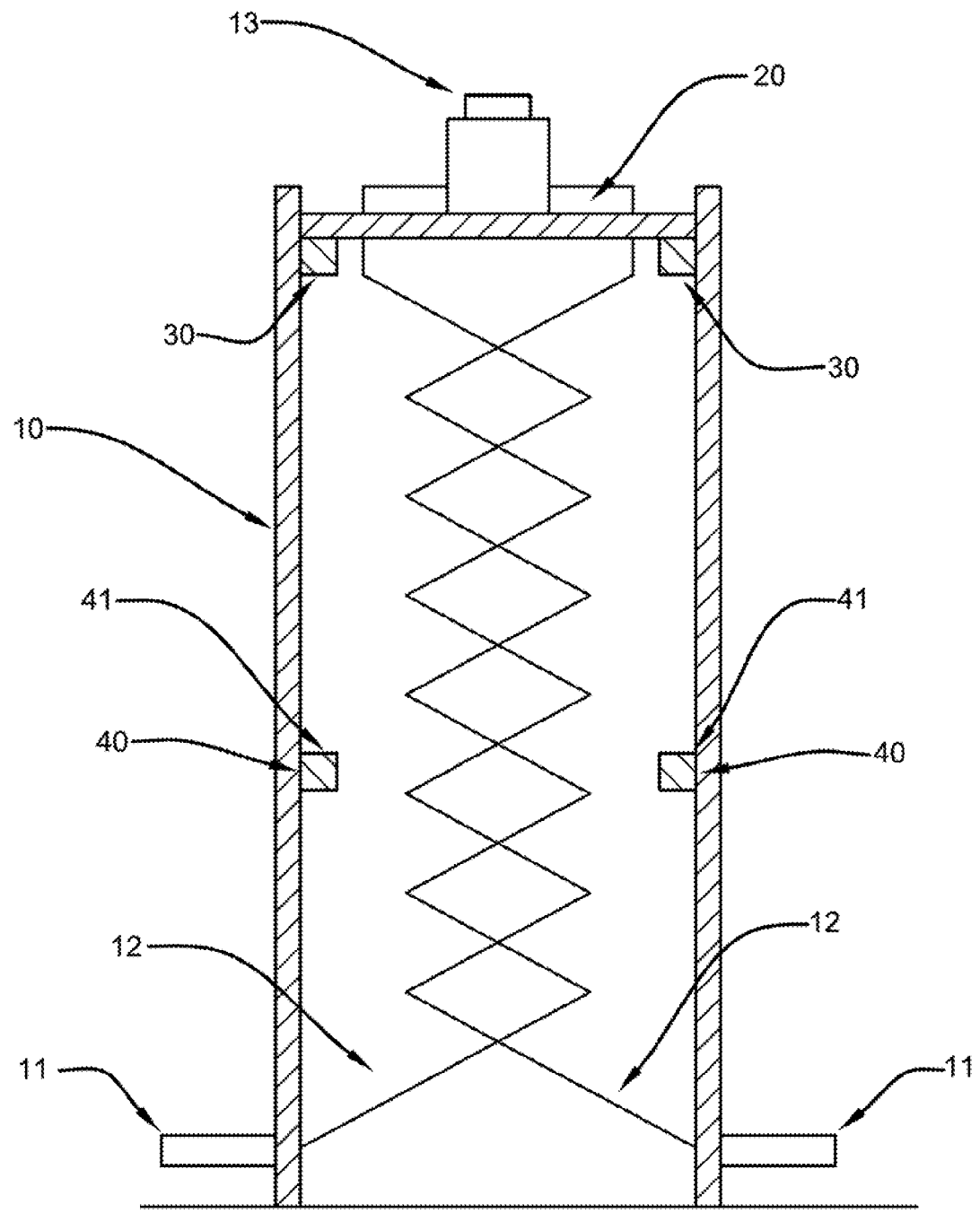
FIG. 2 is a frontal cross sectional schematic view of the components of an exemplary meter box.

Referring now to the drawings wherein the showings are for purposes of illustrating embodiments of the present disclosure only and not for purposes of limiting the same, and wherein like reference numerals are understood to refer to like components. It is known to locate utility meters, such as water meters, below ground level below the frost line. This practice is particularly true in cold weather areas as it reduces possible damage to pipelines or equipment due to thawing and freezing. Such a below ground installation may be accomplished by mounting the meter in an enclosure termed a meter box. The meter box may be buried in the ground with its top surface at approximately ground level. FIG. 1 and FIG. 2 show an exemplary meter box 10. The meter box 10 may be sealed at its open end by a meter box cover 50 as illustrated in FIGS. 5-11 and 14-18. The meter box 10 and corresponding meter box cover 50 may be of any size and shape. In certain embodiments, the meter box 10 is in the shape of a cylinder and the meter box cover 50 is circular. On its open end, the meter box 10 may have a receiving surface 16 (shown in FIG. 16) sized and shaped to receive the meter box cover 50. In one installation (shown in FIG. 2), utility pipelines are connected to the meter box near the box's bottom end using a plurality of utility line connectors 11. The utility line connectors 11 may extend through the wall of the meter box 10. An inlet water line may be connected to one end of an individual connector 11 which is accessible from the exterior of the meter box 10. Pre-coiled, flexible tubing 12 may be connected to the opposite end of the same connector 11 on the interior of the meter box 10. This same connection procedure may be carried out with an outlet utility line thus allowing fluid to flow through the meter box 10. Connected between the two distal ends of the flexible tubing 12, through inlet 14 and outlet valves 15, may be a utility meter 13 which rests upon a meter platform 20. The flexible tubing 12 allows the utility meter 13 to be raised and lowered vertically within the interior of the meter box 10 by securing the meter platform 20 to support shelves such as upper support shelves 30 and lower support shelves 40. Material used to manufacture the meter box 10 may be chosen with the sound judgment of a person of skill in the art.

Figure 3:
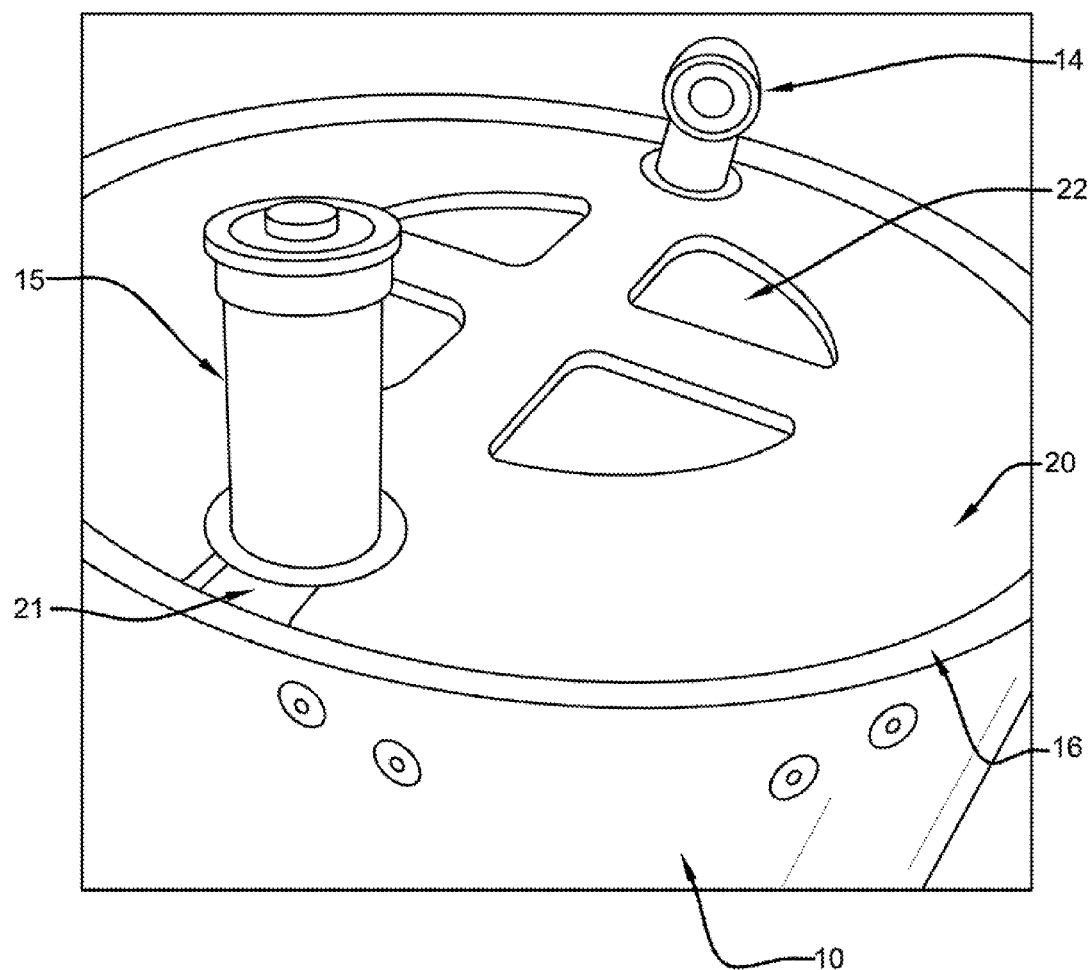
FIG. 3 is a close-up perspective view of an exemplary meter platform with an inlet and outlet valve shown.
Figure 20:
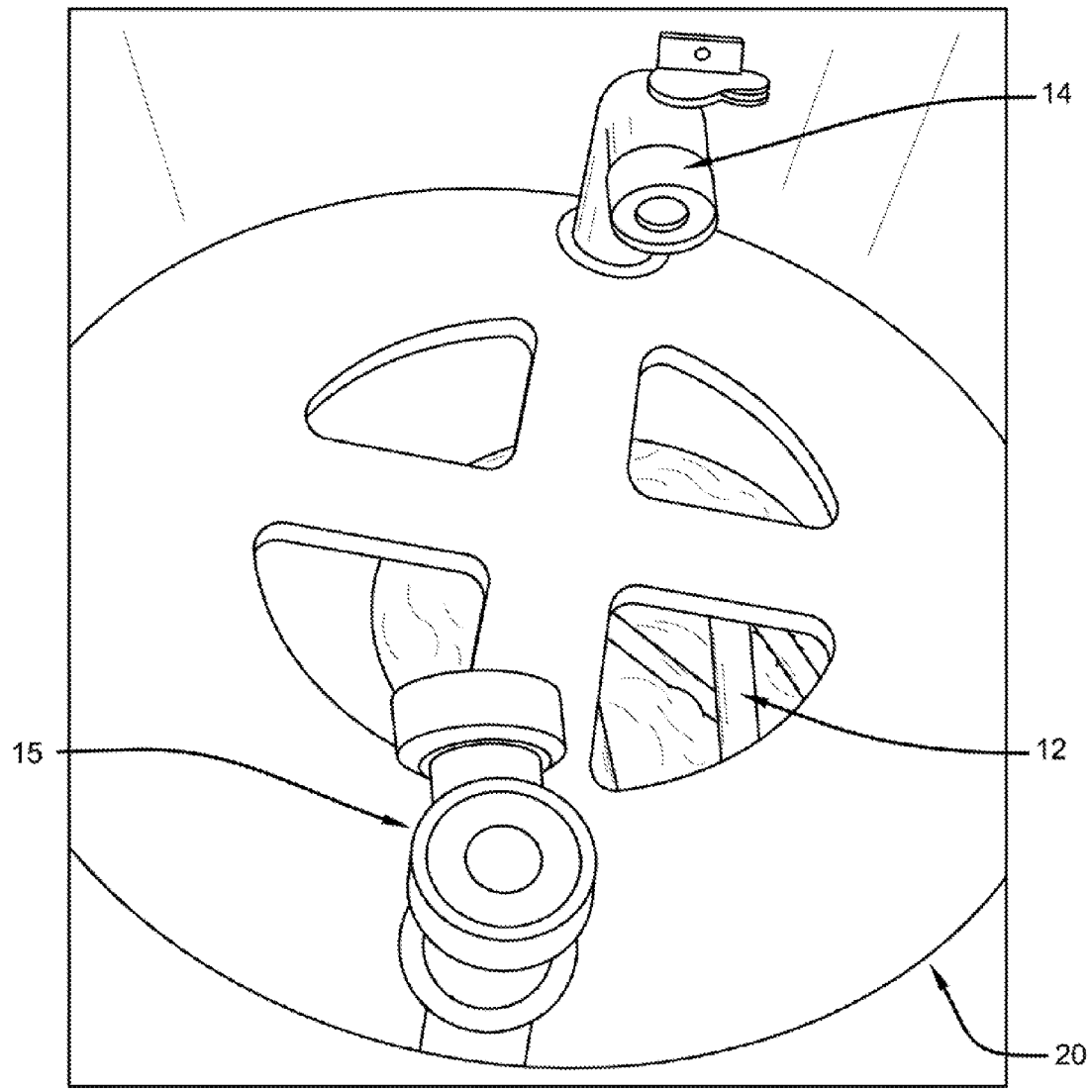
FIG. 20 is close-up perspective view of an exemplary meter box with an exemplary meter platform placed on lower support shelves.

With reference to FIG. 3, the utility meter 13 may be mounted on a meter platform 20. The outside size and shape of the meter platform 20 may be made to fit within the interior of the meter box 10. A plurality of retaining apertures 21 may exist around the perimeter of the meter platform 20. These retaining apertures 21 may be sized and located to retain inlet 14 and outlet 15 valves and allow the flexible tubing 12 to connect to the valves. The meter platform 20 may additionally have a plurality of gripping apertures 22 located substantially in the center of the meter platform 20. These gripping apertures 22 may be sized and located to allow a user to grip and then raise or lower the meter platform 20. Also illustrated within FIG. 3 is a retaining surface 16 which is used for receiving and holding the meter box cover 50. FIG. 20 illustrates a meter platform 20 placed on lower support shelves 40 (not shown) within the interior of the meter box 10. In certain embodiments, an insulation pad (not shown) may be placed within the meter box 10 to rest above the meter platform 20 and trap relatively warm air rising from the earth inside the meter box. Material used to manufacture the meter platform 20 may be chosen with the sound judgment of a person of skill in the art.

Figure 4:
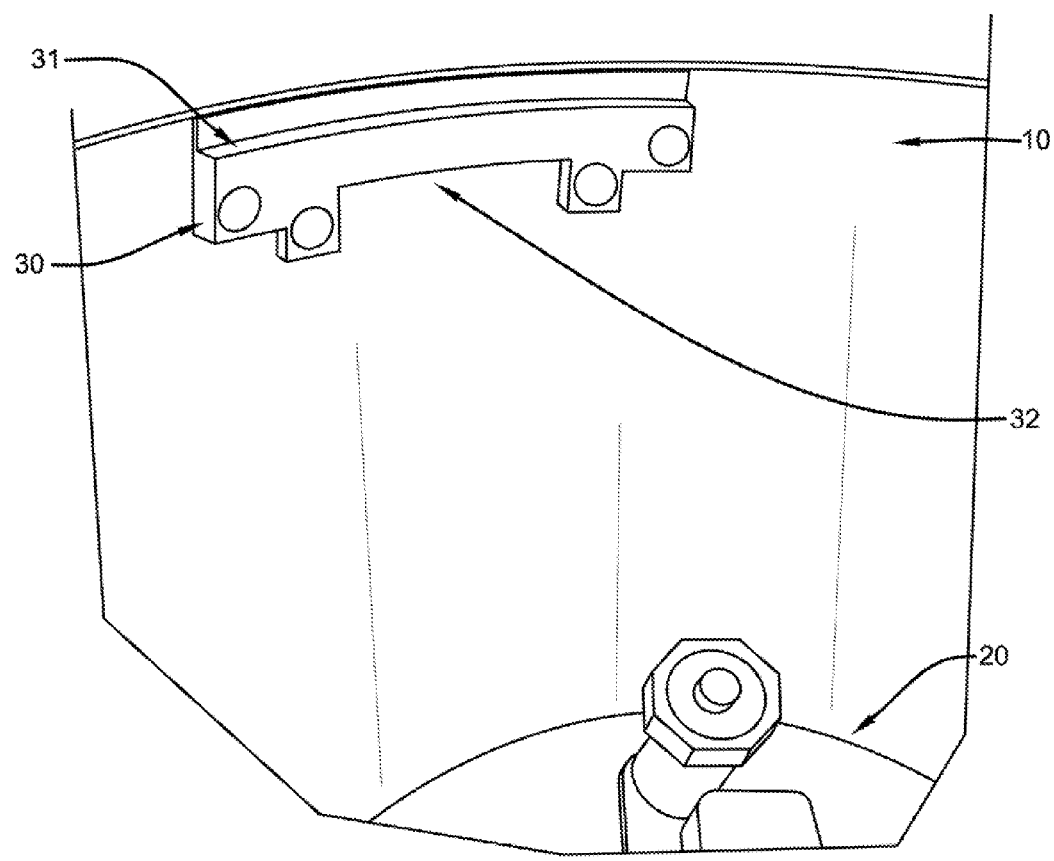
FIG. 4 is a perspective view of the interior of an exemplary meter box having an upper support shelf and a meter platform resting on lower support shelves.
Figure 19:
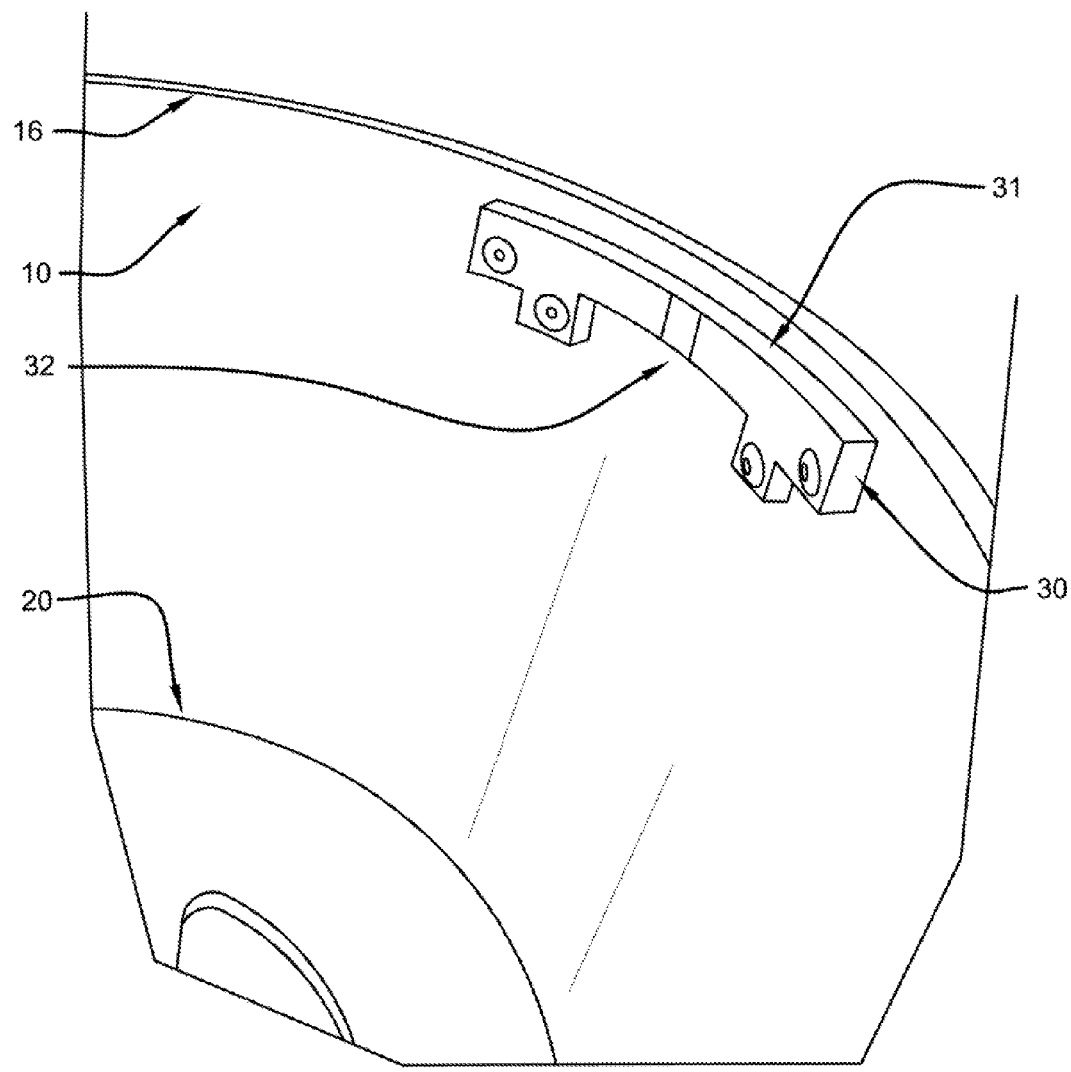
FIG. 19 is a perspective view of the interior of an exemplary meter box having an upper support shelf, a securing feature and a meter platform resting on lower support shelves.

With reference to FIGS. 4 and 19, the interior surface of meter box 10 may contain a plurality of upper support shelves 30. The support shelves 30 may be vertically located near the open end of the meter box 10. The upper support shelves 30 may have a support surface 31 facing the open end of the meter box 10. The support shelves 30 may be sized to allow the meter platform 20 to sit securely on support surface 31. Additionally, the upper support shelves 30 may have a securing feature 32 formed on the surface opposite the support surface 31. The securing feature 32 may be sized and shaped to receive a retaining hook 70 and a spring latch apparatus 60 (shown in FIGS. 6 and 7) or a worm gear latch 80 (shown in FIGS. 8, 11 and 14). In one embodiment the upper support shelves 30 may be fixedly attached to the interior wall of meter box 10. In a second embodiment the upper support shelves 30 may be integrally formed in the interior wall of meter box 10. Material used to manufacture the upper support shelves 30 may be chosen with the sound judgment of a person of skill in the art.

The interior surface of meter box 10 may contain a plurality of lower support shelves 40. The lower support shelves 40 may be vertically located near the bottom end of the meter box 10. The lower support shelves 40 may have a support surface 41 facing the open end of the meter box 10. The lower support shelves 40 may be sized to allow the meter platform 20 to sit securely on support surface 41 (shown in FIG. 2). In one embodiment the lower support shelves 40 may be fixedly attached to the interior wall of meter box 10. In another embodiment the lower support shelves 40 may be integrally formed in the interior wall of meter box 10. Material used to manufacture the lower support shelves 40 may be chosen with the sound judgment of a person of skill in the art.

Figure 5:
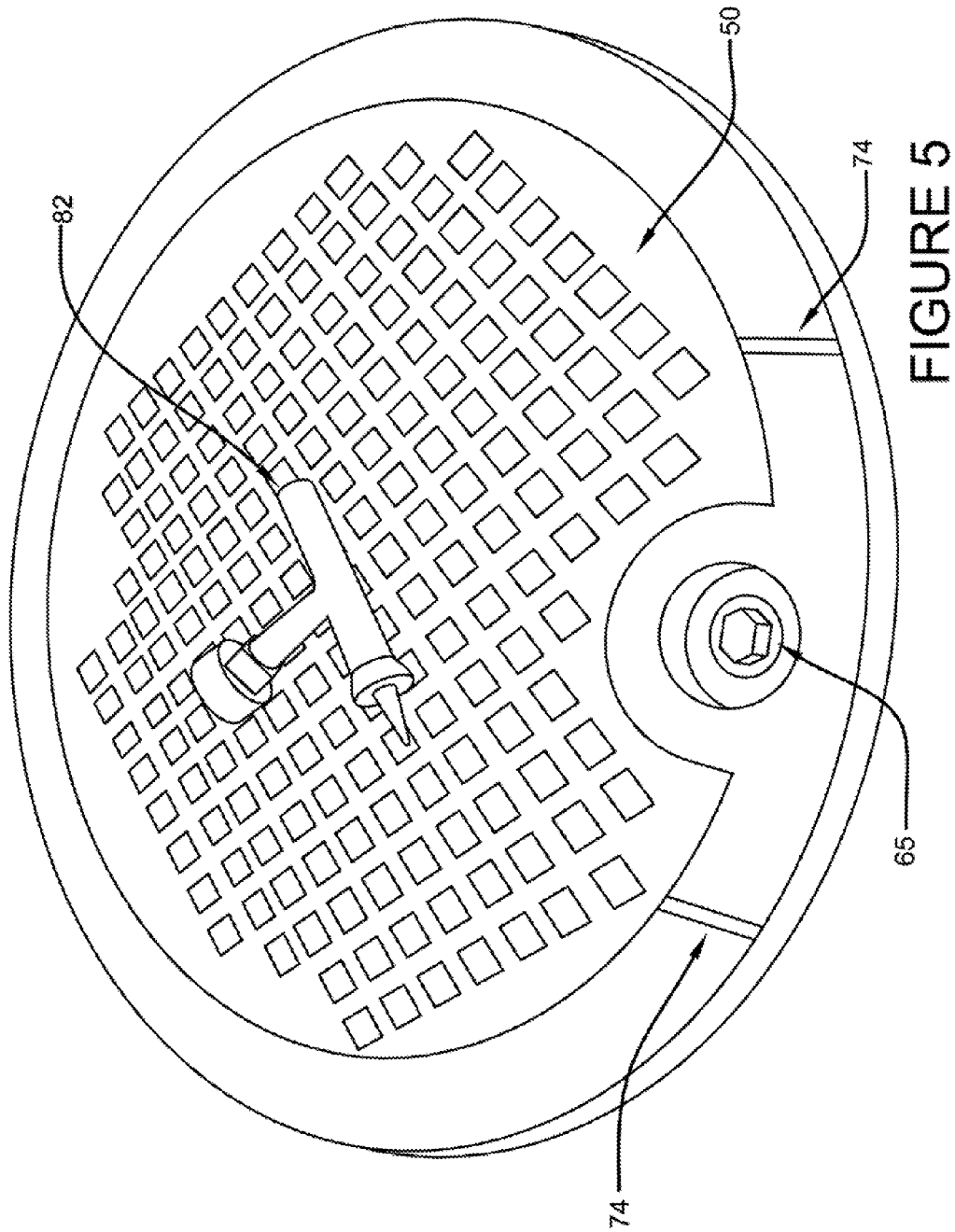
FIG. 5 is a top view of the top side of an exemplary meter box cover.

With reference to FIG. 5, the top surface of the meter box cover 50 is shown. The meter box cover 50 may have indicia on its top surface. The size and shape of the meter box cover 50 may be chosen with sound judgment of a person of skill in the art such that the cover 50 will securely fit on the open end of meter box 10. Now with reference to FIG. 6, the bottom surface of the meter box cover 50 is shown. A sealing surface 51 may be formed on the perimeter surface of meter box cover 50. Sealing surface 51 may be sized to mate with receiving surface 16 of meter box 10 to allow a secure placement of cover 50 onto meter box 10. In one embodiment there may be a plurality of radial 52 and annular ribs 53 formed on the bottom surface of the meter box cover 50. The meter box cover 50 may be made from material that is essentially transparent to the transmission of wireless communication waves (e.g., a composite polymer). Material used to manufacture the meter box cover 50 may be chosen with the sound judgment of a person of skill in the art.

Figure 6:
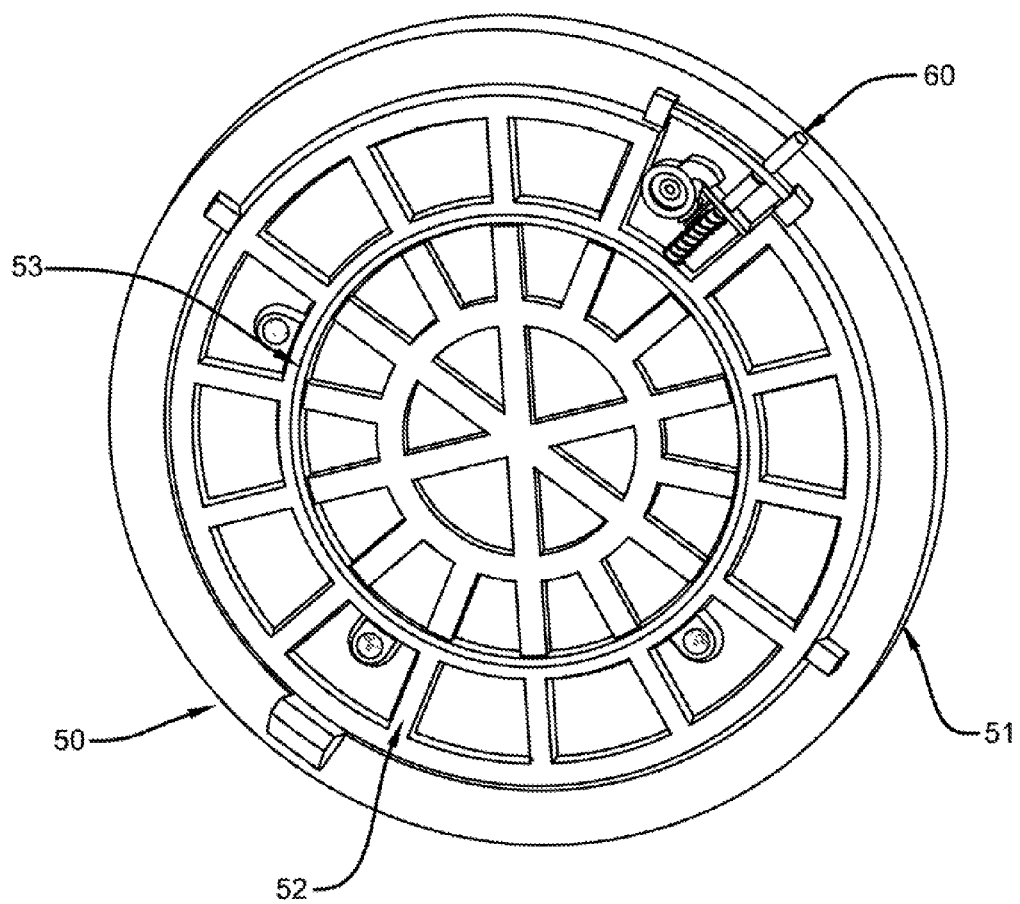
FIG. 6 is a perspective view of the bottom surface of an exemplary meter box cover having a spring latch apparatus.
Figure 7:
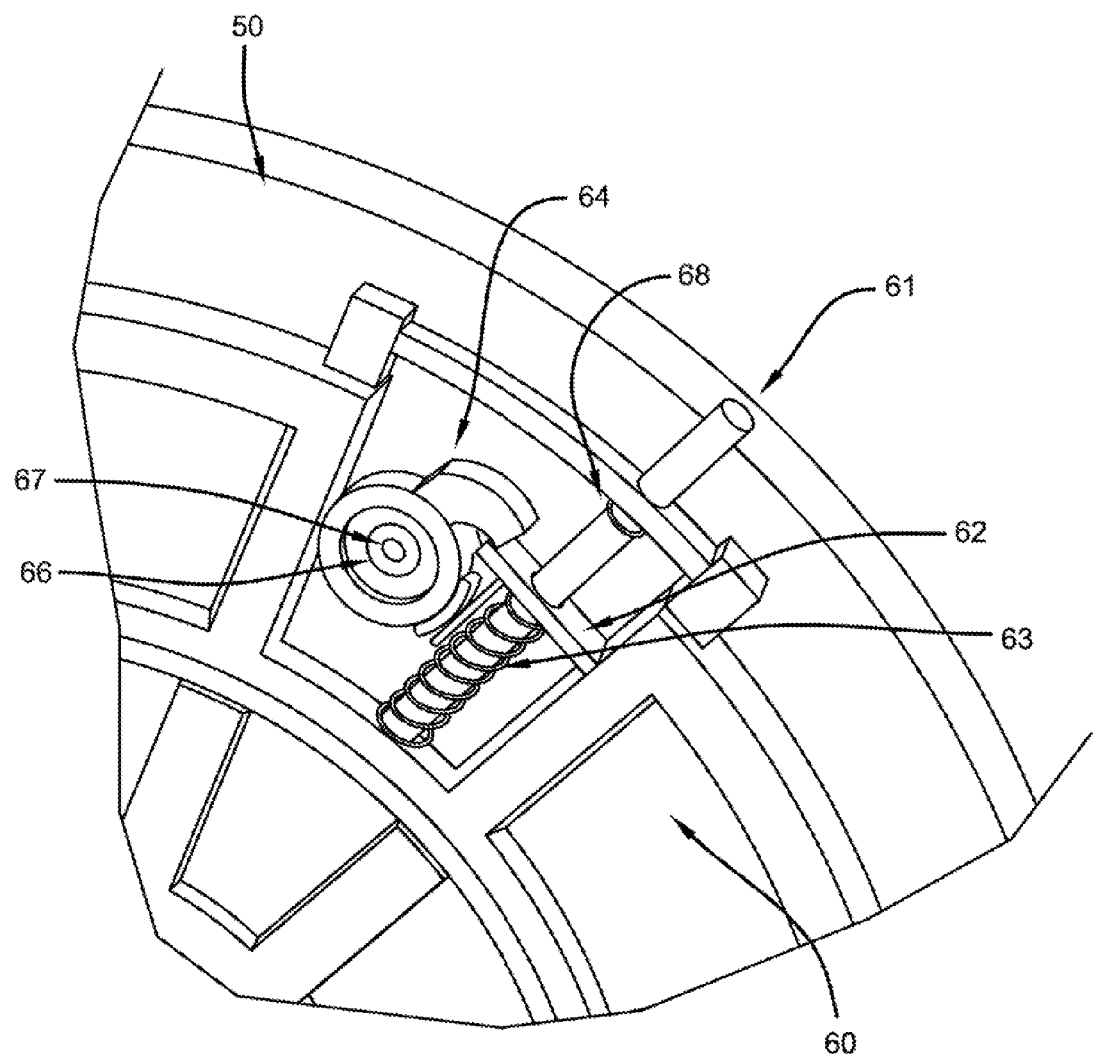
FIG. 7 is a close-up perspective view of an exemplary spring latch apparatus.
Figure 25:
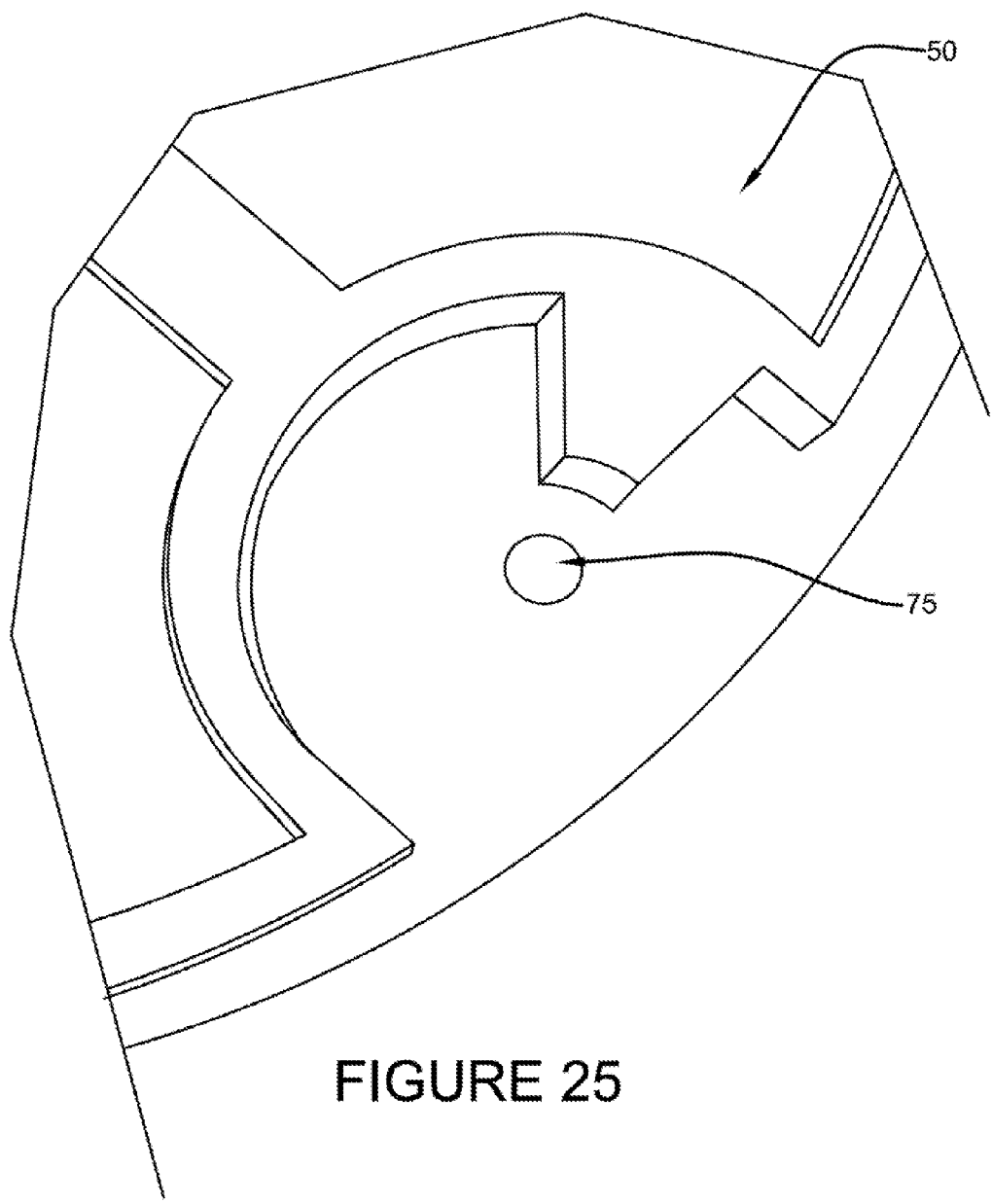
FIG. 25 is a close-up perspective view of a bottom surface of an exemplary meter box cover containing an aperture.

With reference to FIG. 6 and FIG. 7, one embodiment of the meter box cover 50 may include a spring latch apparatus 60 located on its bottom surface near its perimeter. The spring latch apparatus 60 may comprise a securing stud 61 located inside stud guides 68 which may be formed within the annular ribs. Positioned over securing stud 61 may be a spring 63 and a loading plate 62. Spring 63 may be compressed by actuator 64 which is in contact with the loading plate 62. This is accomplished by the actuator 64 causing the loading 62 to move and compress the spring 63. Actuator 64 may have an aperture and the meter cover 50 may have an aperture 75 (shown in FIG. 25) into which a bolt 65 (shown in FIGS. 12 and 13) is positioned. Bolt 65 is secured to actuator 64 on one end using bolt retainer 67 and washer 66. The opposite end of bolt 65 may be of a configuration that allows the user to rotate bolt 65 using an appropriate tool. Non-limiting examples of such configurations include a hexhead, a slotted head, a penta style head, and other tamper proof bolt head configurations. In an alternate embodiment, a bushing 69 (shown in FIG. 13) may be inserted over bolt 65 so as to provide a contacting interface between the actuator 64, the bolt 65, and the meter box cover 50. The spring 63, loading plate 62 and actuator 64 are positioned so that rotation of the bolt 65 within the actuator 64 can cause the loading plate 62 to compress or release the spring 63 which can cause the securing stud 61 to extend or retract to engage or disengage the securing feature 32 on the upper support shelf 30. Materials used to manufacture spring latch apparatus 60 may be chosen with sound judgment of a person of skill in the art.

Figure 16:
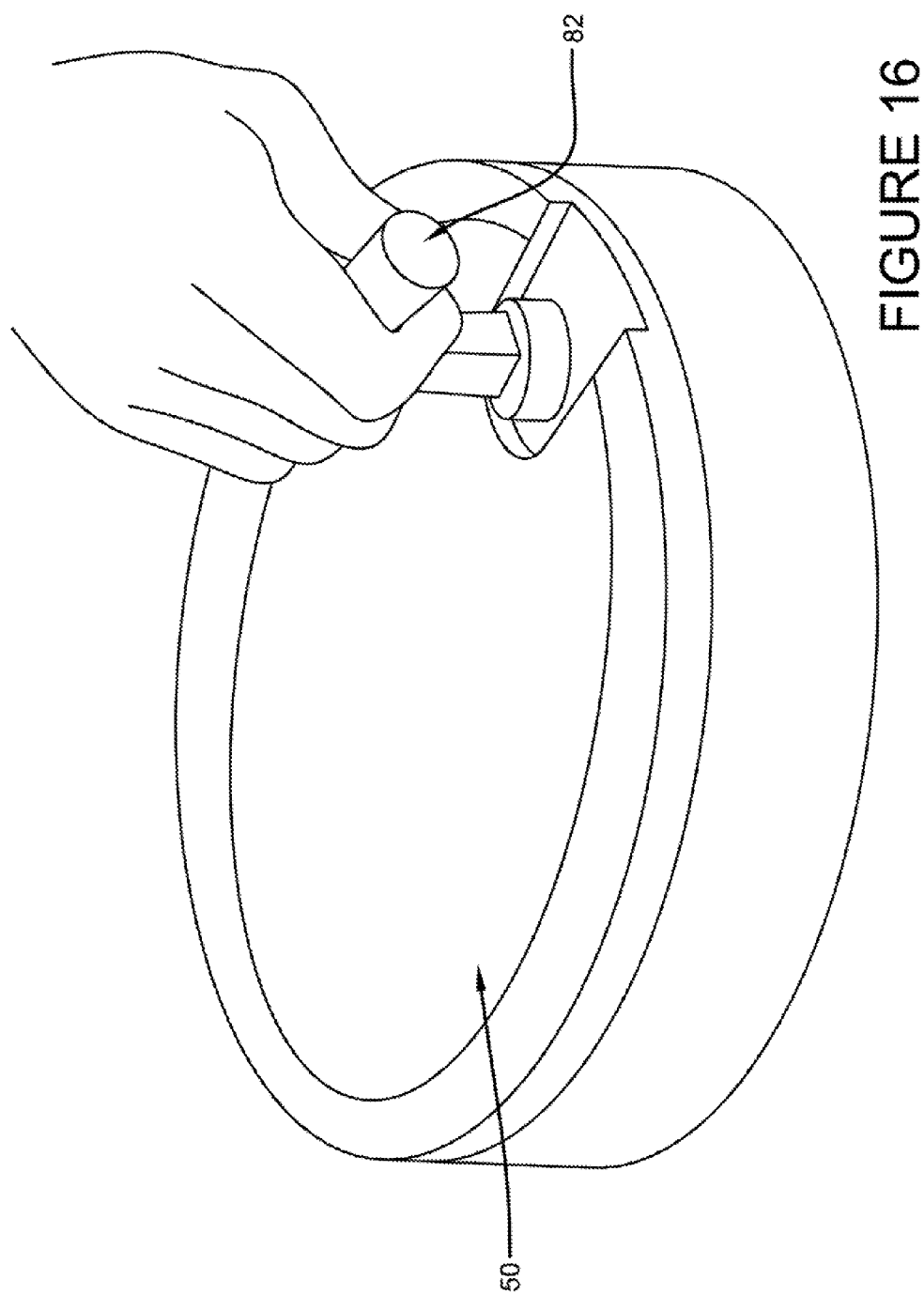
FIG. 16 is a perspective view of a user placing a tool on a bolt and demonstrating how an exemplary meter box cover may be secured.

In one embodiment, spring latch apparatus 60 may be used to secure the meter box cover 50 to meter box 10. The spring latch apparatus 60 may be located on the bottom surface of the meter box cover proximate to the perimeter of the meter box cover as shown in FIG. 6. The spring latch apparatus 60 may be used to secure the meter box cover 50 to meter box 10 according to the following method. First, an appropriate tool is placed over the head of the bolt 65 to rotate the bolt 65 which in turn will cause the actuator 64 to rotate so that the spring 63 is compressed and the securing stud 61 is not extended. The meter box cover 50 is then placed onto meter box 10 so that the cover's sealing surface 51 mates with receiving surface 16 of the meter box 10 and the securing stud 61 aligns with securing feature 32 on the appropriate upper support shelf 30. The spring latch apparatus 60 is then released. This is accomplished by placing the tool over the head of the bolt 65 to turn the bolt 65 in the opposite direction so that spring 63 returns to its original, essentially uncompressed, position, thereby allowing securing stud 61 to extend into securing feature 32. FIG. 16 illustrates a user engaging the bolt 65 with a tool 82 to secure the meter box cover 50 to the meter box 10 or to disengage the meter box cover 50 from the meter box 10.

Figure 8:
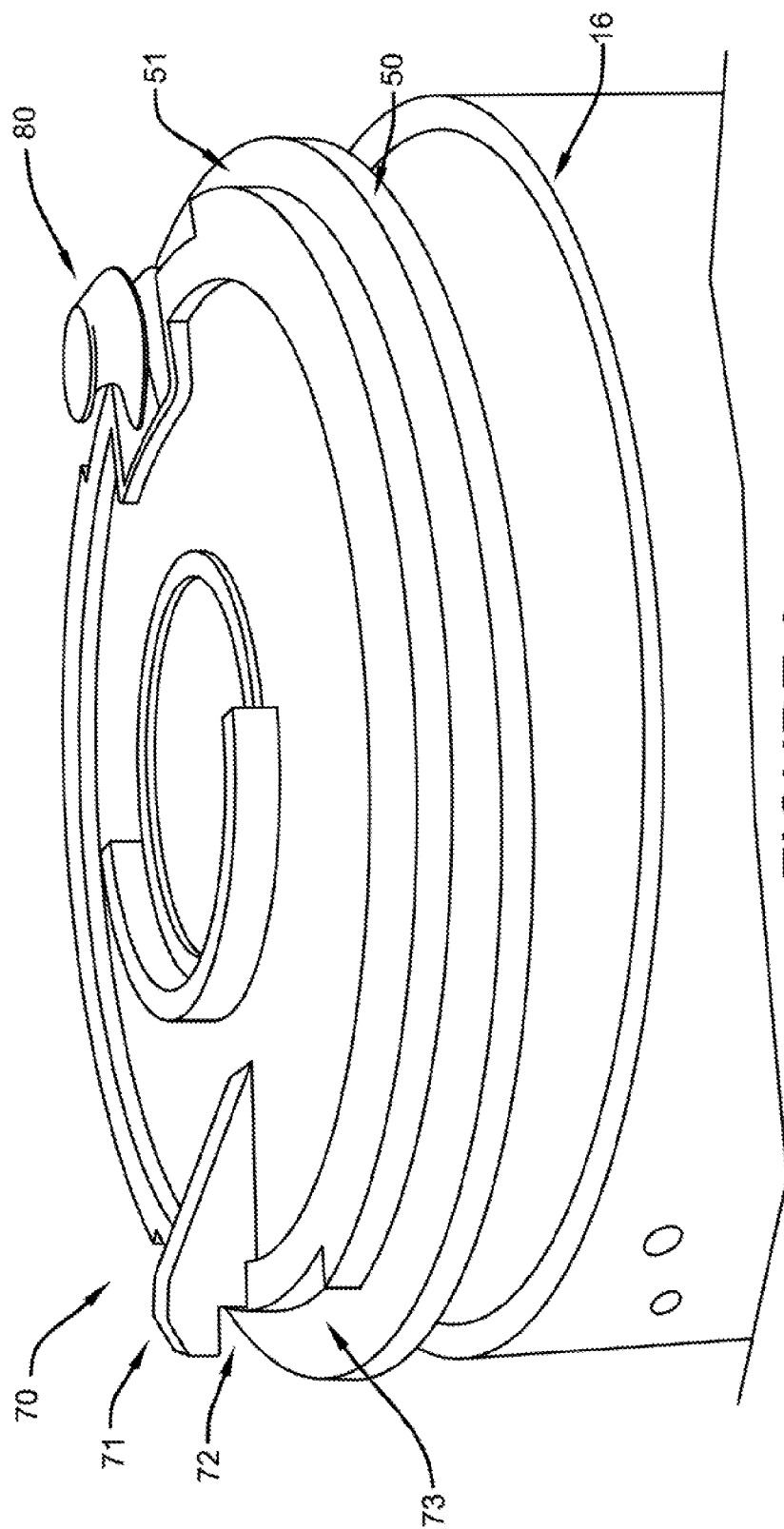
FIG. 8 is a perspective view of the bottom surface of an exemplary meter box cover having a retaining hook, alignment cutouts and a worm gear latch.
Figure 9:
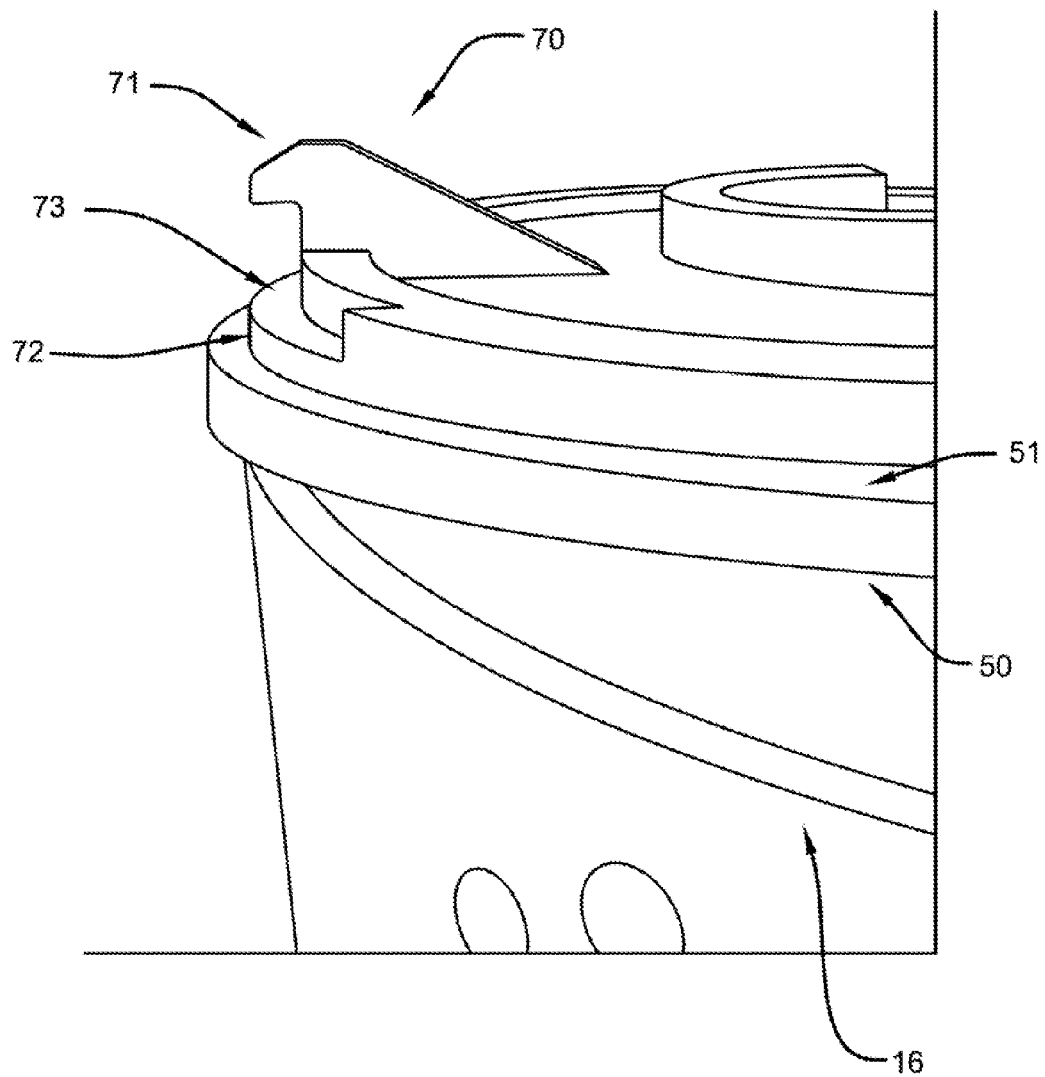
FIG. 9 is a close-up perspective view of an exemplary retaining hook and alignment cutout.
Figure 10:
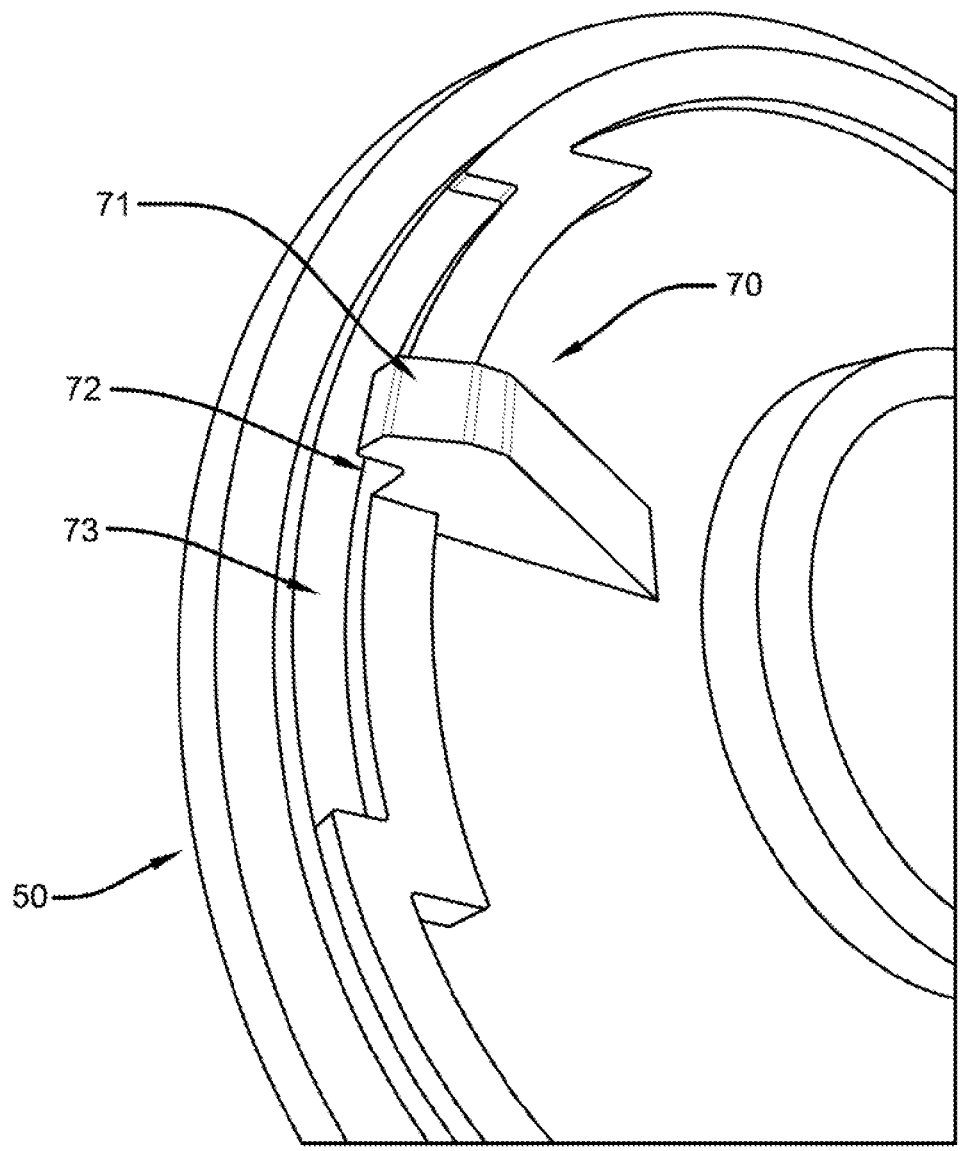
FIG. 10 is an alternate close-up perspective view of an exemplary retaining hook and alignment cutout.

With reference to FIGS. 8, 9, 10 and 11, the bottom surface of the meter box cover 50 is shown in another embodiment. In this embodiment of the meter box cover 50, a retaining hook 70 and a worm gear latch 80 may be located on the meter box cover's 50 bottom surface proximate to the perimeter of the meter box cover 50 and positioned substantially 180 degrees from each other. Retaining hook 70 protrudes from the bottom surface of the meter box cover 50. The distal end of retaining hook 70 may have a securing portion 71 which extends in a substantially radial direction from center of cover 50. Meter box cover 50 may have a clearance portion 72 recessed into its bottom surface. Clearance portion 72 may be located substantially below securing portion 71. Additionally clearance portion 72 contains alignment cutouts 73 which extend in a substantially parallel direction to the bottom surface of the meter box cover 50. The clearance portion 72 and alignment cutouts 73 may allow the bottom surface of the meter box cover 50 to engage the upper support shelf 30. If the clearance portion 72 and alignment cutouts 73 are not aligned with upper support shelves 30, the meter box cover 50 may not be able to be installed. Retaining hook 70, securing portion 71, clearance portion 72, and alignment cutouts 73 may be sized and formed in such a manner as to mate with support surface 31 and securing feature 32 of upper support shelf 30. FIGS. 8 and 9 also illustrate the sealing surface 51 of the meter box cover 50. In certain embodiments, the meter box cover 50 may also include indicators 74 (as shown in FIG. 5) on the outer diameter of the top surface which allow a user to install and secure the meter box cover 50 onto a meter box without having to look and/or position his or her underneath the meter box cover to see how wide the alignment cutouts 73 are in relation to the width of the support shelf within a meter box. Material used to manufacture the retaining hook 70 may be chosen with the sound judgment of a person of skill in the art.

Figure 11:
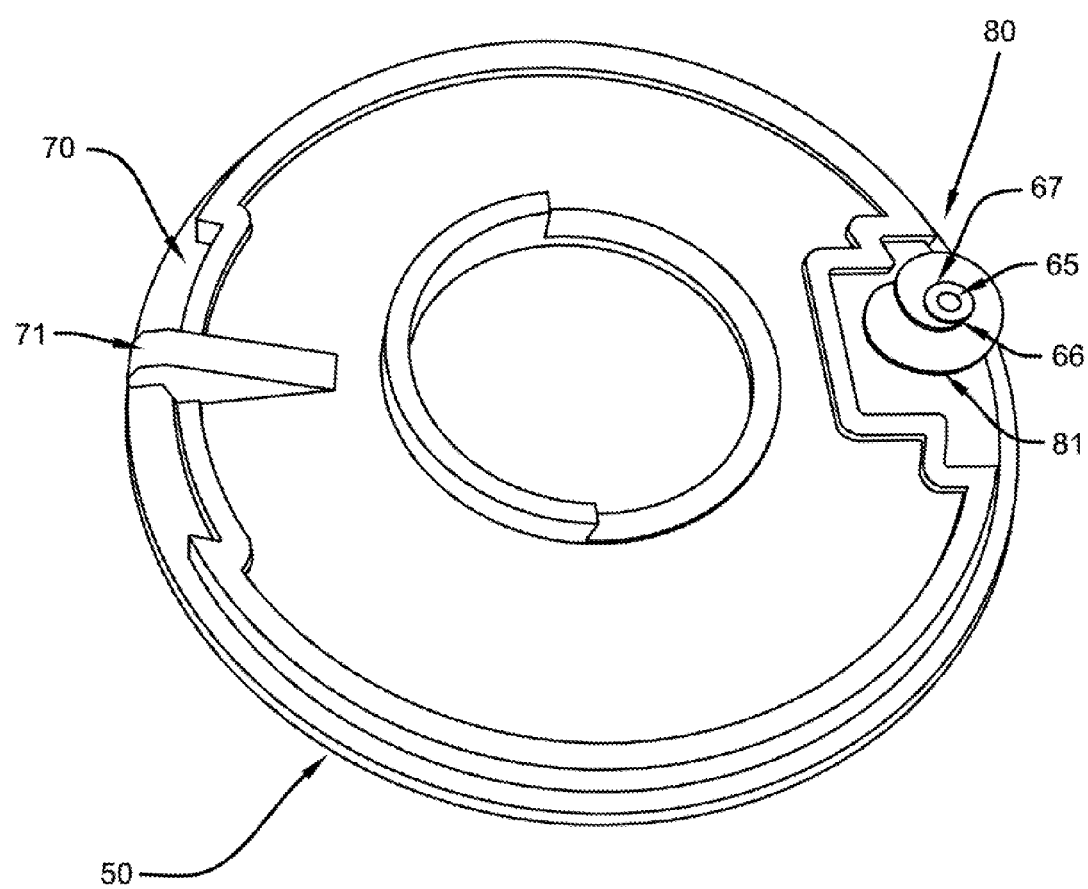
FIG. 11 is a frontal perspective view of the bottom surface of an exemplary meter box cover having a retaining hook, alignment cutouts and a worm gear latch.
Figure 12:
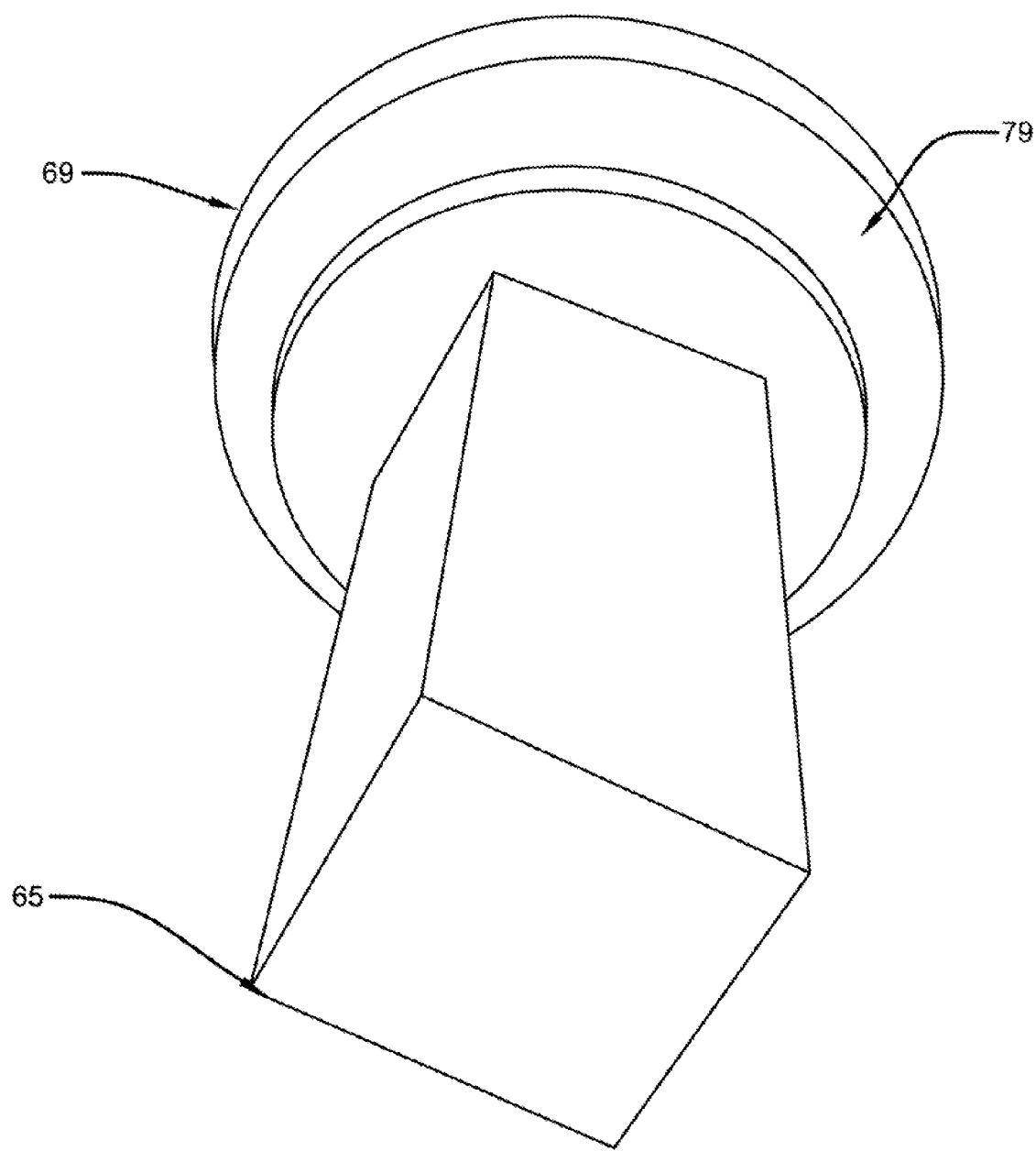
FIG. 12 is a perspective end view of an exemplary bolt and bearing washer.
Figure 13:
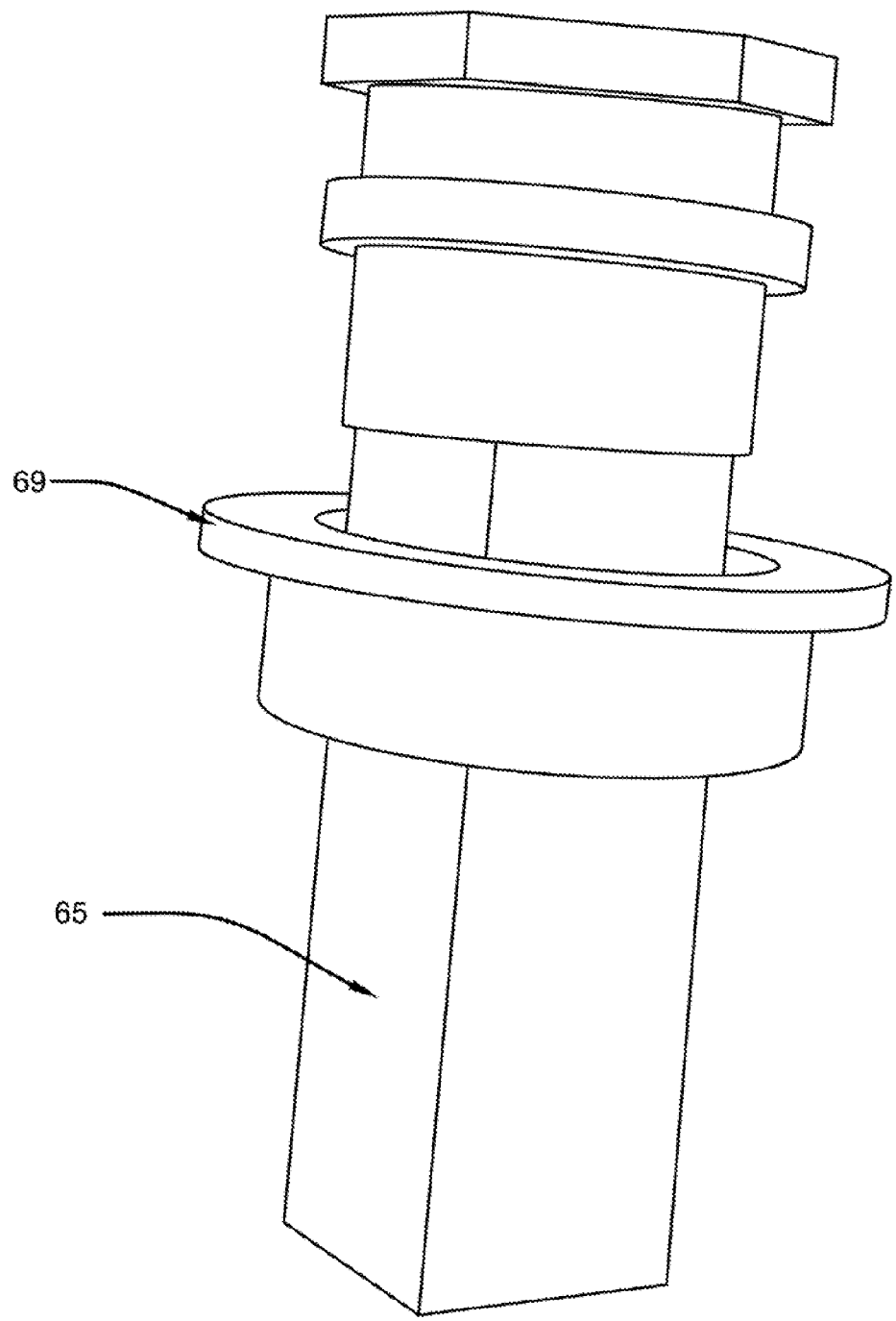
FIG. 13 is a perspective view of an exemplary bolt and bushing.

Continuing with reference to FIGS. 8 and 11, a worm gear latch 80 may be located substantially 180 degrees from retaining hook 70. Worm gear latch 80 may comprise a rotatable worm gear 81, a bolt 65 (as shown in FIGS. 12 and 13), a washer 66, a bushing 69 (as shown in FIGS. 12 and 13), a bearing washer 79 (as shown in FIG. 12) and a bolt retainer 67. Worm gear latch 80 may be installed on the meter box cover 50 by inserting a bushing 69, and then the bolt 65 into a aperture 75 (shown in FIG. 25) in the meter box cover 50 so that head of bolt 65 is on the top surface of the meter box cover 50 and the distal end of bolt 65 extends to the bottom surface of the meter box cover 50. A bearing washer 79 can be installed over the distal end of bolt 65, flush with the bottom surface of the meter box cover 50. Worm gear 81 may be inserted over the distal end of bolt 65. Worm gear 81 may be secured to the meter box cover 50 using washer 66 and bolt retainer 67 inserted over the distal end of the bolt 65. With reference to FIGURE's 12 and 13, in an alternate embodiment, bushing 69 may be inserted over the bolt 65 so as to provide contacting interfaces between the bolt 65, the worm gear 81 and the meter box cover 50 when assembled. A bearing washer 79 may be inserted over the distal end of the bolt 65 to provide contacting interfaces between the worm gear 81, the bolt 65, and the meter box cover 50. The worm gear latch 80 may engage a second upper support shelf 30 by turning the head of the bolt 65 which secures the worm gear latch 80 to the meter box cover 50. Turning bolt 65 causes the worm gear to rotate and engage the second upper support shelf securing the meter box cover 50 to the meter box 10. The worm gear may be manufactured from any type of metal or may be manufactured from a polymer. Materials used to manufacture the worm gear latch 80 may be chosen with sound judgment of a person of skill in the art.

In one exemplary embodiment, the bolt 65 may have a substantially cylindrical shape. With reference to FIG. 12 and FIG. 13, in another exemplary embodiment, the bolt 65 may be substantially prism shaped with at least one non-circular side. For example, the bolt 65 may be in the shape of a square or rectangular shank. The bolt 65 may be made of any material known to those of skill in the art including but not limited to brass, bronze or any other type of metal or plastic.

The bushing 69, washer 66, bearing washer 79 and bolt retainer 67 may be made of any material known to those of skill in the art including but not limited to brass, bronze or any other type of metal or plastic. In certain embodiments, the shank of the bolt 65 shall not bear directly upon the meter box cover but shall be installed with a full length sleeve (not shown). The metal sleeve may be made of any metal or metal alloy such as a bronze bearing alloy. The metal sleeve may prevent elongation or excessive wear to the aperture in the meter box cover 50.

Figure 14:
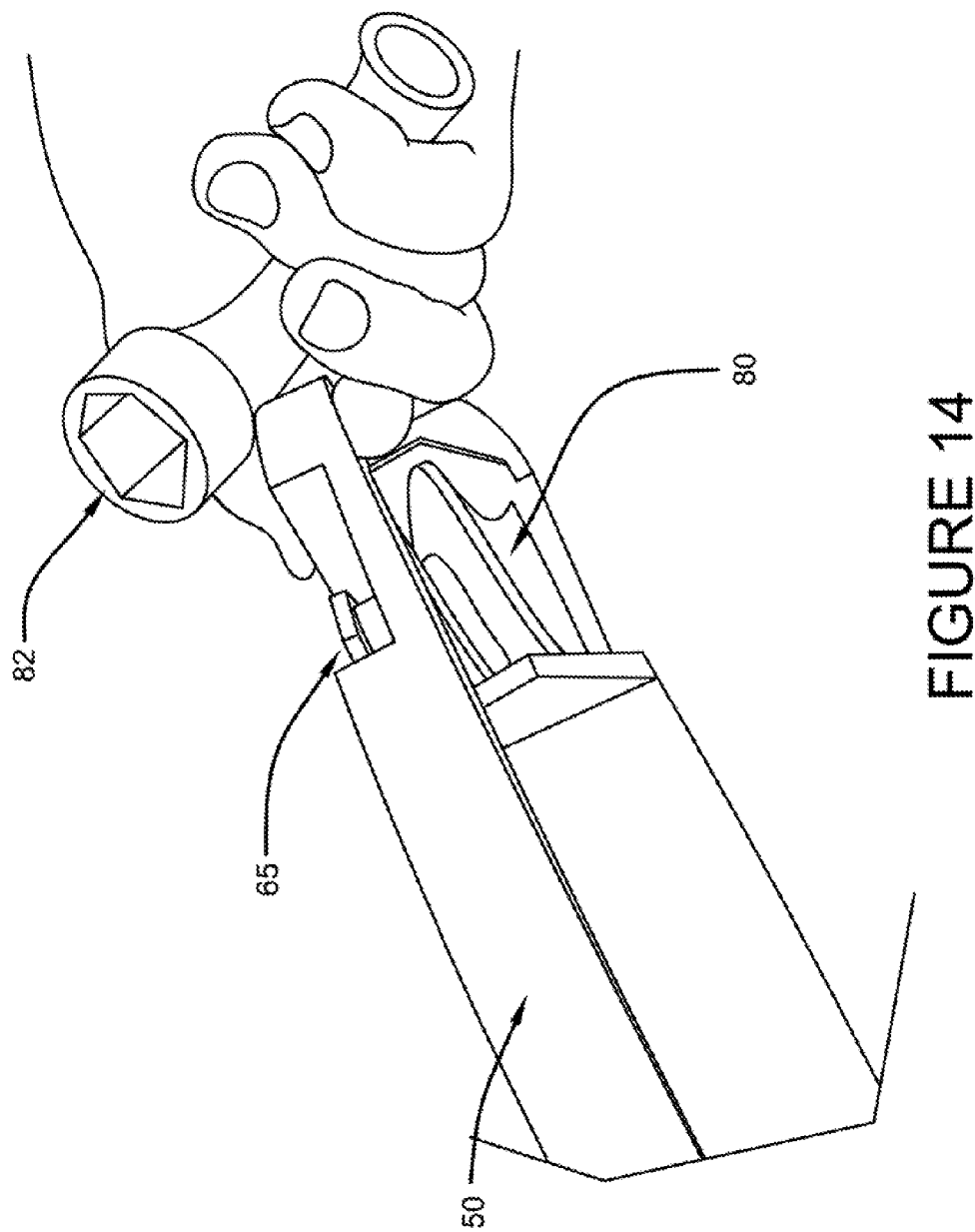
FIG. 14 is a perspective view of an exemplary meter box cover having a worm gear latch and a tool to rotate the worm gear.
Figure 15:
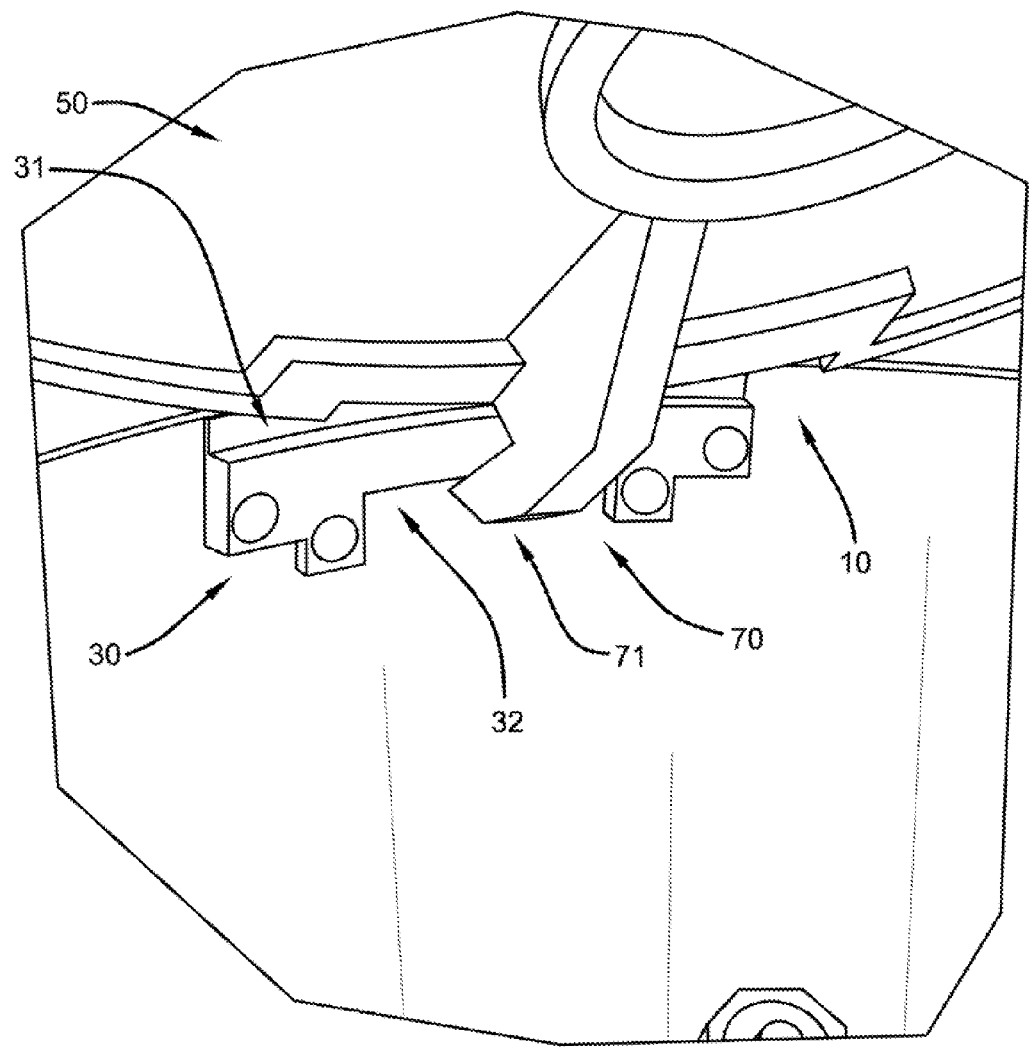
FIG. 15 is a perspective view of an exemplary a meter box cover being installed with alignment cutouts "in line" with a meter box upper support shelf
Figure 17:
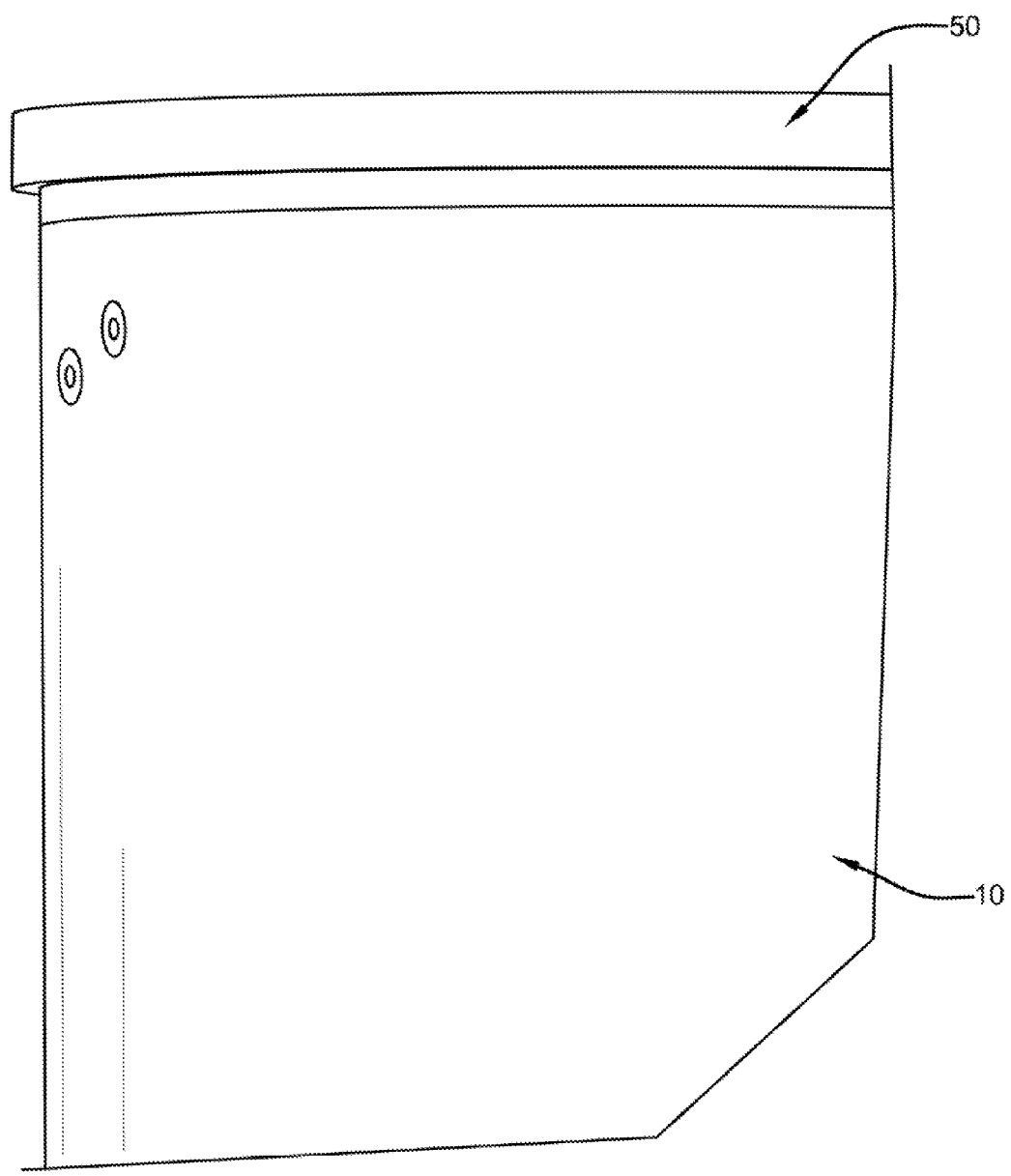
FIG. 17 is a perspective view showing an exemplary meter box cover not in alignment with an exemplary meter box.
Figure 18:
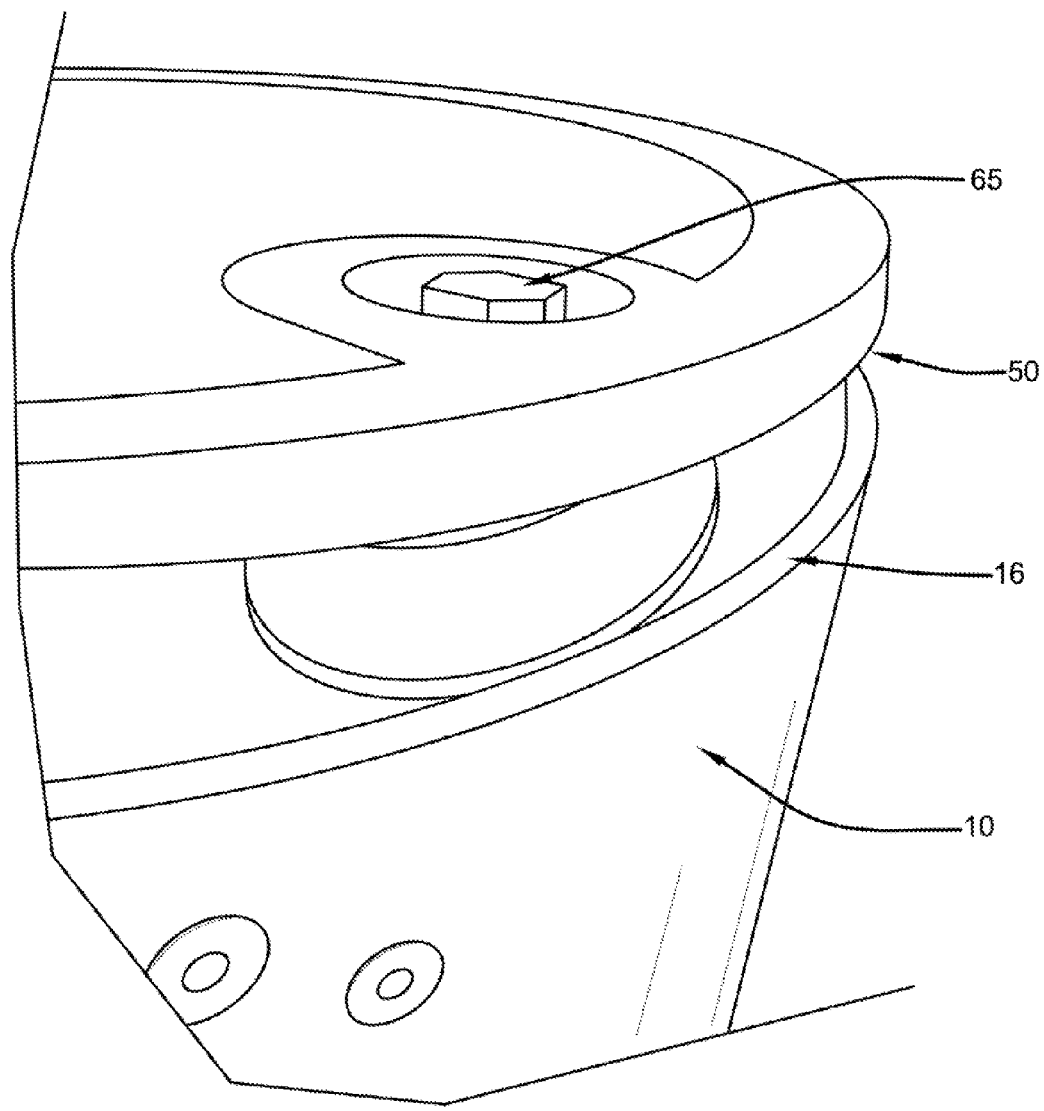
FIG. 18 is a close up view of an exemplary meter box cover not in alignment with an exemplary meter box.

In one embodiment, meter box cover 50 may be secured to the meter box 10 using a retaining hook 70 and worm gear latch 80 using the following method. With reference to FIG. 8, FIG. 14 and FIG. 15, the retaining hook 70, clearance portion 72 and seating surface 73 are aligned with securing feature 32 of the upper support shelf 30. During installation, the meter box cover 50 may be tilted at an angle such that securing portion 71 may be positioned beneath surface of securing feature 32. The meter box cover 50 may be lowered onto the meter box 10 with the securing portion 71 hinging on securing feature 32 and with the receiving surface 16 and sealing surface 51 being aligned. In certain embodiments, the meter box cover 50 may not be installed if the alignment cutouts 73 are not centered over the securing feature 32 and the upper support shelves 30. FIGS. 17 and 18 illustrate a meter box cover 50 not in alignment with a meter box 10 in that the alignment cutouts on the cover are not straddling the upper shelf/securing feature of the meter box. An appropriate tool may be placed over the head of bolt 65 and the worm gear 81 may be rotated until the meter box cover 50 is securely engaged with meter box 10 as illustrated in FIG. 16.

The meter box receiving surface 16 and meter box cover sealing surface 51 may be beveled at mating angles or may not be beveled at mating angles. In certain exemplary embodiments, the meter box receiving surface 16 and the meter box cover sealing surface 51 are beveled at mating angles of 10 degrees.

Figure 21:
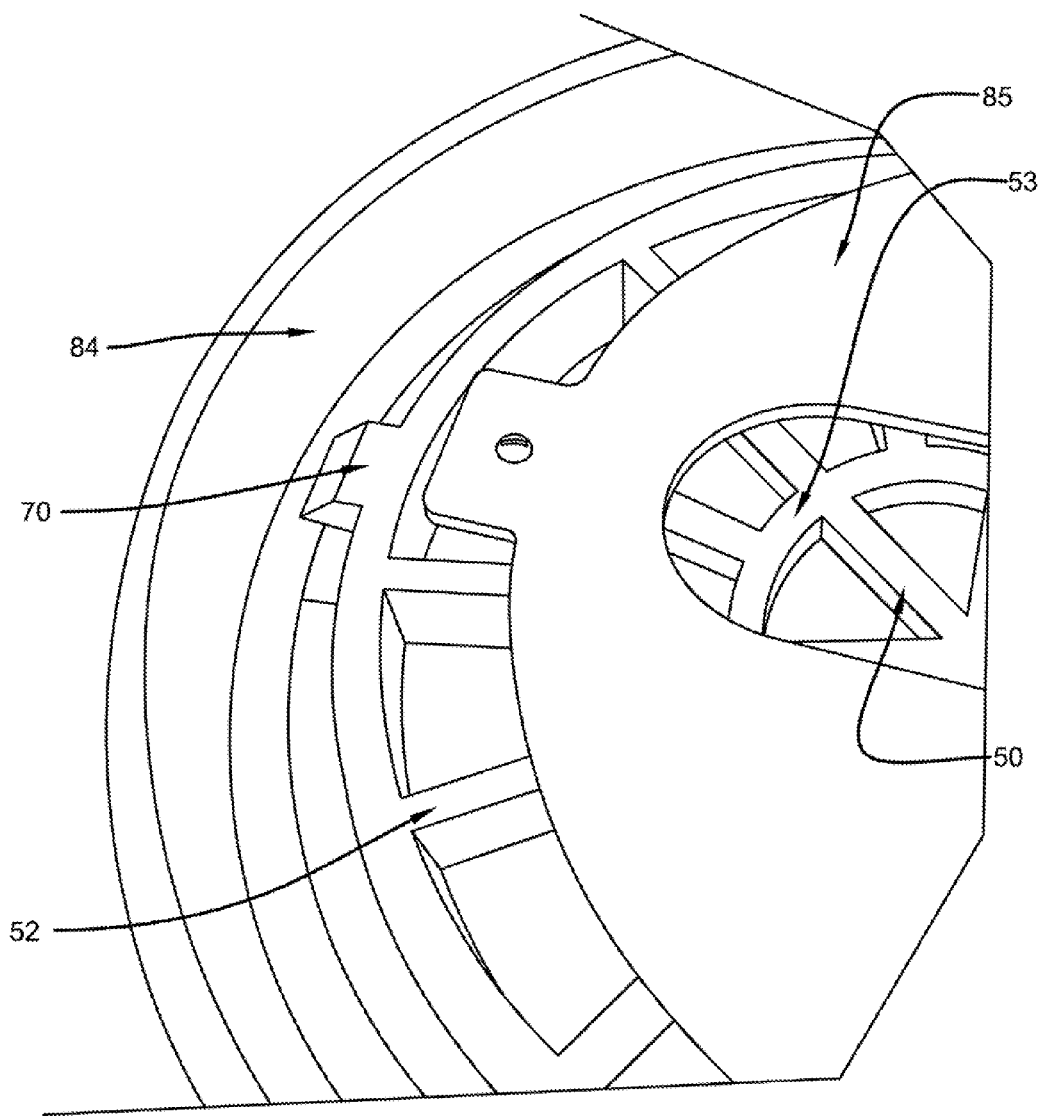
FIG. 21 is a close-up perspective view of an exemplary meter box cover having a retainer plate installed inside a box/frame.
Figure 22:
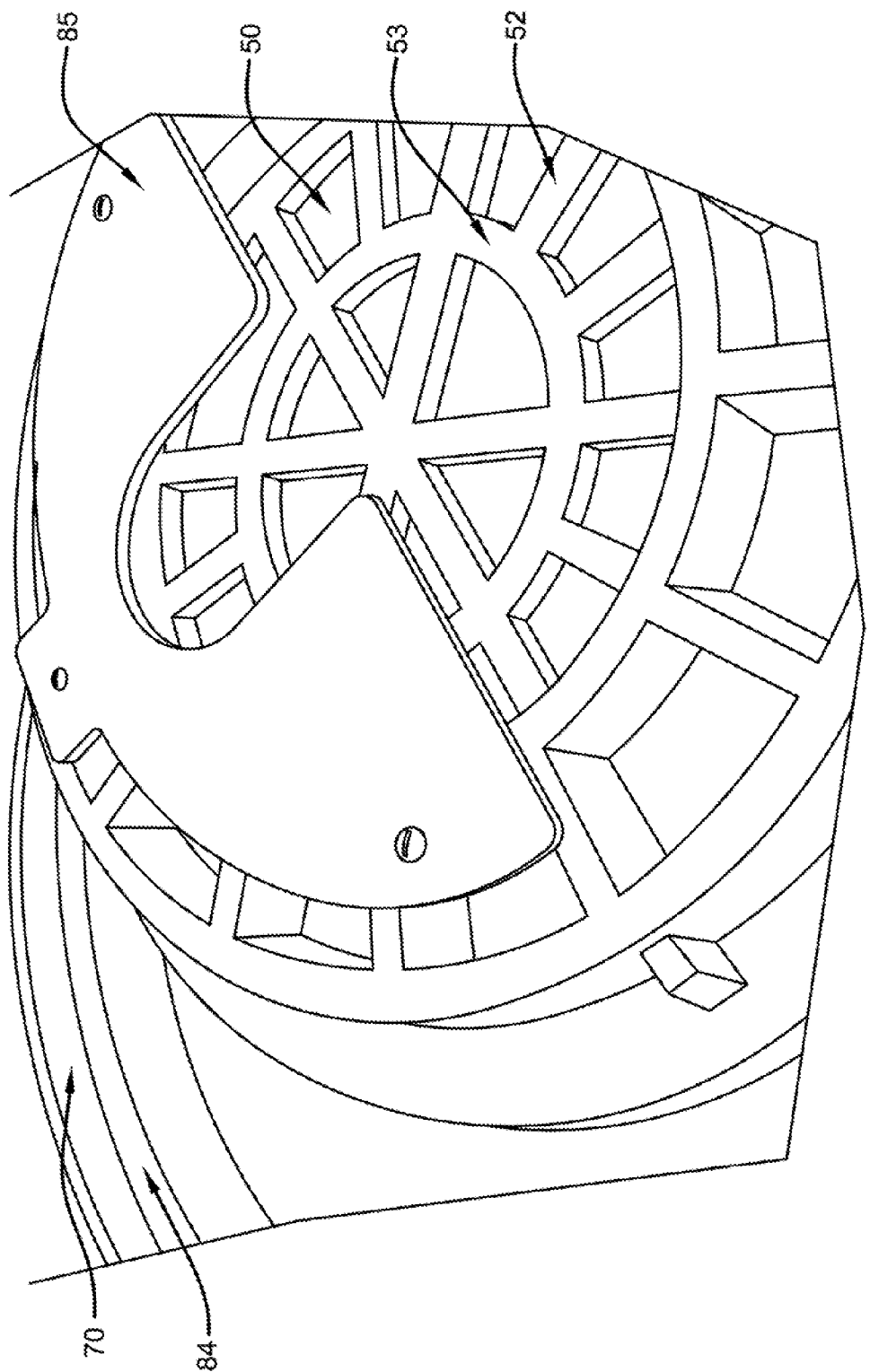
FIG. 22 is a perspective of a view of an exemplary meter box cover having a retainer plate positioned outside of a box/frame.
Figure 23:
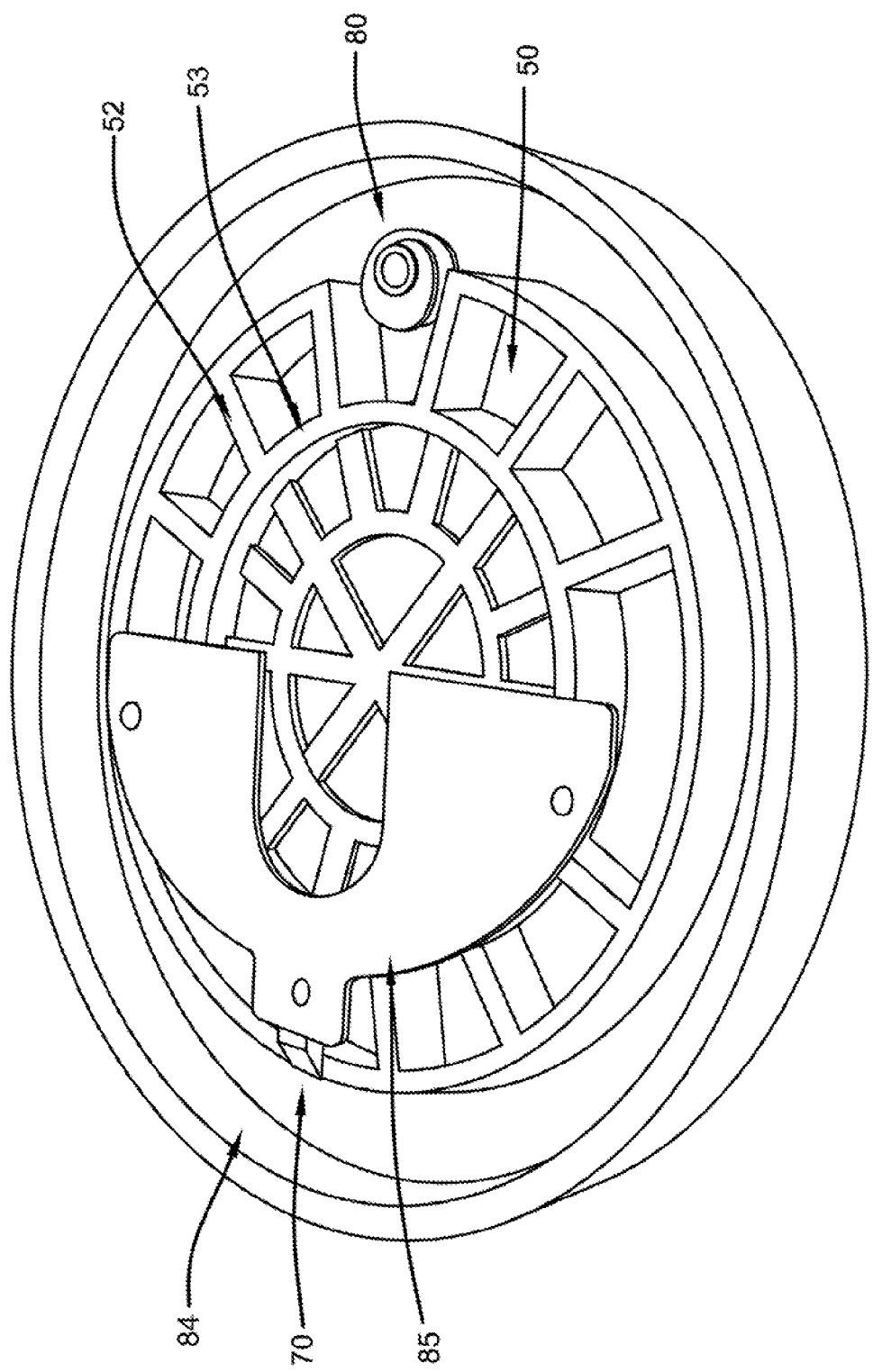
FIG. 23 is a bottom view of an exemplary meter box cover a retainer plate, a worm gear latch and a retainer hook installed inside a box/frame.

FIGS. 21-23 illustrate the bottom surface of an exemplary meter box cover 50 installed inside a box/frame 84. The meter box cover 50 includes a retaining hook 70, alignment cutouts (not shown), radial and annular ribs 52 and 53, a worm gear latch 80 and a retainer plate 85 used to install a radio transmitter unit used for transmitting radio transmission signals between a utility meter and a portable reader.

Figure 24:
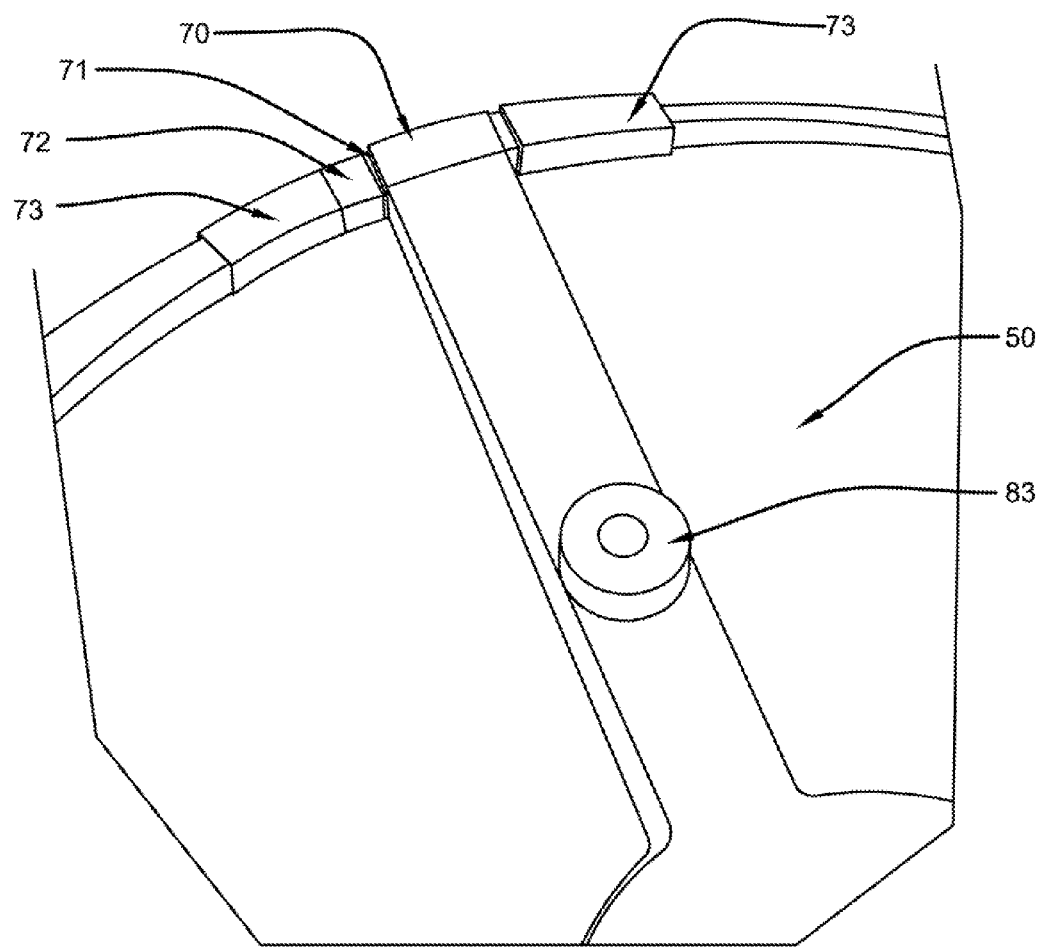
FIG. 24 is close-up perspective view of a bottom surface of an exemplary meter box cover.

FIG. 24 illustrates another exemplary embodiment of a meter box cover 50 having a retaining hook 70, a securing portion 71, a clearance portion 72, alignment cutouts 73 and posts 83 to permit attachment of an ERT mounting bracket. The clearance portion 72 may include a recessed portion capable of engaging a support shelf on a meter box. Clearance portion 72 may be located substantially below securing portion 71. Additionally clearance portion 72 contains alignment cutouts 73 which extend in a substantially parallel direction to the bottom surface of the meter box cover 50. The clearance portion 72 and alignment cutouts 73 may allow the bottom surface of the meter box cover 50 to engage an upper support shelf within a meter box. If the clearance portion 72 and alignment cutouts 73 are not aligned with upper support shelves within a meter box, the meter box cover 50 may not be able to be installed. Retaining hook 70, securing portion 71, clearance portion 72, and alignment cutouts 73 may be sized and formed in such a manner as to mate with a support surface and a securing feature of an upper support shelf which is similar to the upper support shelf 30 described above.

In yet another embodiment illustrated within FIG. 26, meter box cover 50 can be used as a drop-in style (without locks), relying on the overall weight and gravity to keep it seated to the sealing surface 51 of the meter box 10. The drop-in style meter box cover 50 may include a cutout 78 which allows for removal of the meter box cover 50 from the meter box 10. The drop-in style meter box cover 50 has three posts 83 to permit attachment of an ERT mounting bracket. In alternative embodiments (not shown), the meter box cover 50 illustrated within FIG. 26 may include a securing mechanism to engage and secure the meter box cover 50 to a meter box.

In another embodiment (not shown), a multi-purpose magnet can be installed on the bottom surface of the meter cover 50. The multi-purpose magnet may be used in conjunction with a locating device to locate the meter cover 50 if the meter cover 50 is buried below the natural elements of nature.

While the utility meter box, the meter box cover and its various components have been described above in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the utility meter box, the meter box cover and its various components should not be limited to any single embodiment, but rather construed in breadth and scope in accordance with the recitations of the appended claims.

What is claimed is:

1. A meter box cover for a meter box comprising a top surface, a bottom surface, a sealing surface and a securing mechanism, wherein the sealing surface of the meter box cover is capable of engaging a receiving surface on an open end of a meter box, wherein the meter box cover is manufactured from materials capable of allowing automated reading of a meter positioned within an enclosed meter box using wireless signal transmission methods and wherein the securing mechanism of the meter box cover is capable of engaging a portion of the meter box to secure the meter box cover to the meter box;

wherein the securing mechanism is located on the bottom surface proximate to the perimeter of the meter box cover and wherein the securing mechanism comprises a retaining hook and a worm gear latch positioned substantially 180 degrees from each other; and wherein the worm gear latch comprises a rotatable worm gear, a bolt, a washer, a bushing, a bearing washer and a bolt retainer, wherein the worm gear latch is secured to the meter box cover by a bushing and a bolt, having a head and a distal end, being inserted through an aperture in the meter box cover so the head of the bolt is on the top surface of the meter box cover and the distal end of the bolt extends to the bottom surface of the meter box cover; a bearing washer being inserted over the distal end of the bolt, flush with the bottom surface of the meter box cover; a worm gear being inserted over the distal end of the bolt, the worm gear being secured to the meter box cover with a washer and a bolt retainer inserted over the distal end of the bolt.

2. The meter box cover of claim 1, wherein the bottom surface of the meter box cover comprises radial and annular ribs.

3. The meter box cover of claim 2, wherein the securing mechanism is located on the bottom surface proximate to the perimeter of the meter box cover and wherein the securing mechanism comprises a spring latch apparatus.

4. The meter box cover of claim 3, wherein the spring latch apparatus comprises a securing stud positioned inside stud guides formed within the annular ribs of the meter box cover; a spring and a loading plate positioned over the securing stud; and an actuator having an aperture aligned with an aperture in the meter box cover into which a bolt is positioned to secure the actuator to the meter box cover, wherein the actuator is in contact with the loading plate and wherein the spring, loading plate and actuator are positioned so that rotation of the bolt within the actuator can cause the loading plate to compress or release the spring which can cause the securing stud to extend or retract to engage or disengage a securing feature within the meter box.

5. The meter box cover of claim 1, wherein the retaining hook comprises a securing portion capable of engaging a securing feature within the meter box and a clearance portion and alignment cutouts allowing the bottom surface of the meter box cover to engage a support shelf which forms a securing feature within the meter box, wherein the meter box cover further comprises indicators on the top surface which can be adapted for installation and securing the meter box cover onto a meter box without having to visualize how wide the alignment cutouts are in relation to the support shelf within a meter box.

6. The meter box cover of claim 1, wherein the worm gear latch is capable of engaging a securing feature within the meter box by turning the head of the bolt securing the worm gear latch to the meter box cover, which causes the worm gear to rotate and engage the securing feature.

7. The meter box cover of claim 6, wherein the bolt for securing the worm gear latch to the meter box cover is substantially prism shaped with at least one non-circular side.

8. The meter box cover of claim 1, wherein the meter box cover is fabricated from a composite polymer capable of providing radio frequency transparency.

9. The meter box cover of claim 8, wherein the meter box cover has a weight of less than about 60 lbs and a load rating of at least 20,000 lbs.

10. A meter box comprising an open end, a bottom end, at least one vertical wall, an exterior, and an interior; at least a first and a second utility line connector positioned on the exterior proximate to the bottom end of the meter box which extend through the wall of the meter box; a meter platform which is designed to engage an inlet valve, an outlet valve, and a utility meter within the interior of the meter box; at least one upper support shelf and at least one lower support shelf within the interior of the meter box capable of engaging and supporting the meter platform in a substantially horizontal position; conduit which runs from the first utility line connector, through the interior of the meter box to the inlet valve; conduit which runs from the inlet valve to the utility meter; conduit which runs from the utility meter to the outlet valve; conduit which runs from the outlet valve through the interior of the meter box to the second utility line connector; and a meter box cover having a top surface, a bottom surface and a sealing surface, wherein the meter box cover is capable of being placed over the open end of the meter box to cover the interior of the meter box, wherein the sealing surface of the meter cover engages a receiving surface on the open end of the meter box and wherein the meter box cover is fabricated from a composite polymer capable of providing radio frequency transparency and comprises a securing mechanism capable of engaging a portion of the meter box to secure the meter box cover to the meter box;

wherein the securing mechanism is located on the bottom surface proximate to the perimeter of the meter box cover and wherein the securing mechanism comprises a retaining hook and a worm gear latch positioned substantially 180 degrees from each other; and wherein the worm gear latch comprises a rotatable worm gear, a bolt, a washer, a bushing, a bearing washer and a bolt retainer, wherein the worm gear latch is secured to the meter box cover by a bushing and a bolt, having a head and a distal end, being inserted through an aperture in the meter box cover so the head of the bolt is on the top surface of the meter box cover and the distal end of the bolt extends to the bottom surface of the meter box cover; a bearing washer being inserted over the distal end of the bolt, flush with the bottom surface of the meter box cover; a worm gear being inserted over the distal end of the bolt, the worm gear being secured to the meter box cover with a washer and a bolt retainer inserted over the distal end of the bolt.

11. The meter box of claim 10, wherein the meter platform comprises at least two retaining apertures for engaging the inlet valve and the outlet valve and at least one gripping aperture for moving the meter platform to its desired position on the at least one upper and the at least one lower support shelves within the interior of the meter box.

12. The meter box of claim 11, wherein the meter box comprises first and second upper support shelves proximate to the open end of the meter box comprising a support surface and a securing feature formed on the surface opposite the support surface capable of engaging the meter cover and the meter platform in a substantially horizontal position, wherein the two upper support shelves are positioned substantially 180 degrees from each other and at substantially the same height from the bottom end of the meter box within the interior of the meter box.

13. The meter box of claim 12, wherein the cylinder of the meter box comprises first and second lower support shelves positioned below the upper support shelves within the interior of the meter box comprising a support surface capable of engaging the meter platform in a substantially horizontal position, wherein the two lower support shelves are positioned substantially 180 degrees from each other and at substantially the same height from the bottom end of the meter box within the interior of the meter box.

14. The meter box of claim 10, wherein the upper and lower support shelves are fixedly attached to the interior wall of the meter box.

15. The meter box of claim 13, wherein the bottom surface of the meter box cover comprises radial and annular ribs and wherein the securing mechanism is located on the bottom surface proximate to the perimeter of the meter box cover and wherein the securing mechanism comprises a spring latch apparatus.

16. The meter box of claim 15, wherein the spring latch apparatus comprises a securing stud positioned inside stud guides formed within the annular ribs of the meter box cover; a spring and a loading plate positioned over the securing stud; and an actuator having an aperture aligned with an aperture in the meter box cover into which a bolt is positioned to secure the actuator to the meter box cover, wherein the actuator is in contact with the loading plate and wherein the spring, loading plate and actuator are positioned so that rotation of the bolt within the actuator can cause the loading plate to compress or release the spring which can cause the securing stud to extend or retract to engage or disengage the securing feature on the upper support shelf.

17. The meter box of claim 12, wherein the retaining hook comprises a securing portion capable of engaging the securing feature on the first upper support shelf and a clearance portion and alignment cutouts allowing the bottom surface of the meter box cover to engage the first upper support shelf.

18. The meter box of claim 12, wherein the worm gear latch is capable of engaging the second upper support shelf by turning the head of the bolt securing the worm gear latch to the meter box cover, which causes the worm gear to rotate and engage the second upper support shelf and wherein the bolt for securing the worm gear latch to the meter box cover is substantially prism shaped with at least one non-circular side.

19. The meter box of claim 10, wherein the meter box cover is fabricated from a composite polymer capable of providing radio frequency transparency, has a weight of less than about 60 lbs and a load rating of at least 20,000 lbs.

20. A meter box cover for a meter box wherein the meter box comprises an open end, a bottom end, at least one vertical wall, an exterior, and an interior; at least a first and a second utility line connector positioned on the exterior proximate to the bottom end of the meter box which extends through the wall of the meter box; a meter platform which is designed to engage an inlet valve, an outlet valve, and a utility meter within the interior of the meter box; at least one upper support shelf and at least one lower support shelf within the interior of the meter box capable of engaging and supporting the meter platform in a substantially horizontal position; conduit which runs from the first utility line connector, through the interior of the meter box to the inlet valve; conduit which runs from the inlet valve to the utility meter; conduit which runs from the utility meter to the outlet valve; conduit which runs from the outlet valve through the interior of the meter box to the second utility line connector; and wherein the meter box cover comprises a top surface, a bottom surface and a sealing surface, wherein the meter box cover is capable of being placed over the open end of the meter box to cover the interior of the meter box, wherein the sealing surface of the meter cover engages a receiving surface on the open end of the meter box; wherein the meter box cover comprises a securing mechanism capable of engaging a portion of the meter box to secure the meter box cover to the meter box; wherein the securing mechanism comprises a retaining hook and a worm gear latch located on the bottom surface proximate to the perimeter of the meter box cover and positioned substantially 180 degrees from each other, wherein the retaining hook comprises a securing portion capable of engaging a securing feature on a first upper support shelf and a clearance portion and alignment cutouts allowing the bottom surface of the meter box cover to engage the first upper support shelf and wherein the worm gear latch is capable of engaging a securing feature on a second upper support shelf; and wherein the worm gear latch comprises a rotatable worm gear, a bolt, a washer, a bushing, a bearing washer and a bolt retainer, wherein the worm gear latch is secured to the meter box cover by a bushing and a bolt, having a head and a distal end, being inserted through an aperture in the meter box cover so the head of the bolt is on the top surface of the meter box cover and the distal end of the bolt extends to the bottom surface of the meter box cover; a bearing washer being inserted over the distal end of the bolt, flush with the bottom surface of the meter box cover, a worm gear being inserted over the distal end of the bolt, the worm gear being secured to the meter box cover with a washer and a bolt retainer inserted over the distal end of the bolt.

* * * * *